United States Patent
Vantalon et al.

(10) Patent No.: US 6,628,891 B1
(45) Date of Patent: Sep. 30, 2003

(54) SIGNAL FILTERING MECHANISM FOR A MULTI-PURPOSE DIGITAL TELEVISION RECEIVER

(75) Inventors: Luc Vantalon, Sunnyvale, CA (US); Arnaud Chataignier, Ceyreste (FR); Christophe Genevois, La Ciotat (FR)

(73) Assignee: SCM Microsystems, Inc., Fremont, CA (US)

( * ) Notice: Subject to any disclaimer, the term of this patent is extended or adjusted under 35 U.S.C. 154(b) by 0 days.

(21) Appl. No.: 09/443,173

(22) Filed: Nov. 19, 1999

(51) Int. Cl.⁷ .................................................. H04N 5/91
(52) U.S. Cl. ...................... 386/94; 380/201; 380/203; 725/34
(58) Field of Search ...................... 386/94, 95; 380/203, 380/201; 725/34; 370/432; H04N 5/91

(56) References Cited

U.S. PATENT DOCUMENTS

| | | | | |
|---|---|---|---|---|
| 5,917,910 A | * | 6/1999 | Ishiguro et al. | 705/57 |
| 6,167,099 A | * | 12/2000 | Rader et al. | 375/347 |
| 6,282,714 B1 | * | 8/2001 | Ghori et al. | 725/81 |
| 6,359,897 B1 | * | 3/2002 | Hessel et al. | 370/429 |
| 6,380,983 B1 | * | 4/2002 | Miyazaki et al. | 348/554 |
| 6,389,532 B1 | * | 5/2002 | Gupta et al. | 713/163 |
| 6,411,946 B1 | * | 6/2002 | Chaudhuri | 706/21 |

* cited by examiner

Primary Examiner—Vincent Boccio
Assistant Examiner—James A. Fletcher
(74) Attorney, Agent, or Firm—John F. Schipper; Richard E. Bee

(57) ABSTRACT

Conditional access methods and apparatus are provided for use with digital television receivers and other digital broadband receivers. The methods and apparatus are capable of handling several different digital signal transmission protocols in an automatic and flexible manner. An input unit is provided for analyzing and tagging incoming data bytes so that further processing operations are less dependent on the transmission format being received. A cipher handling unit is provided for adapting in real time the scrambling and descrambling performances to match the requirements of the transmission network and the receiving apparatus. A filtering mechanism is provided for filtering and handling multiple asynchronous data streams in a parallel manner. A private recording mechanism is provided for making a private copy of selected incoming signals.

23 Claims, 41 Drawing Sheets

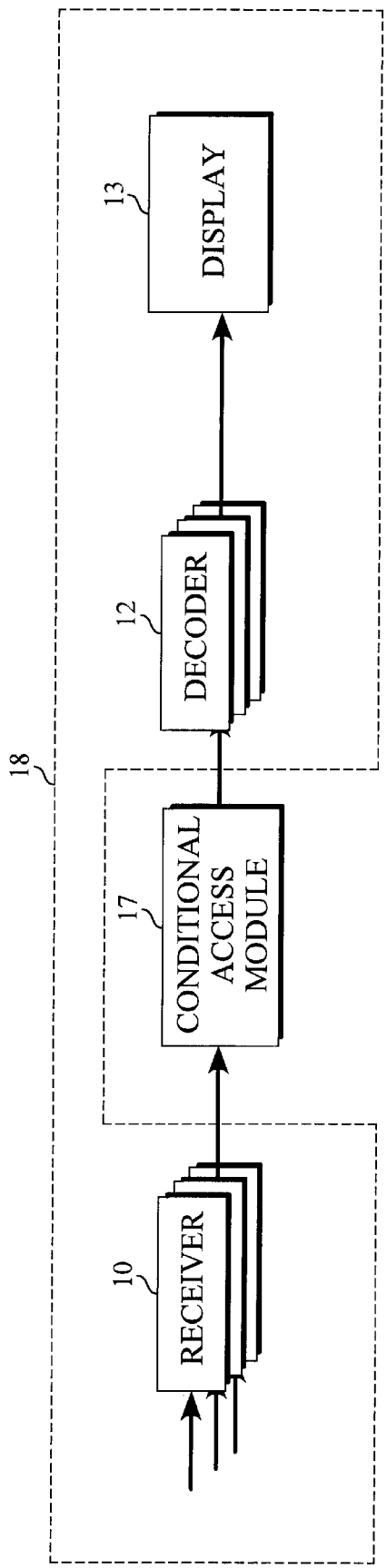
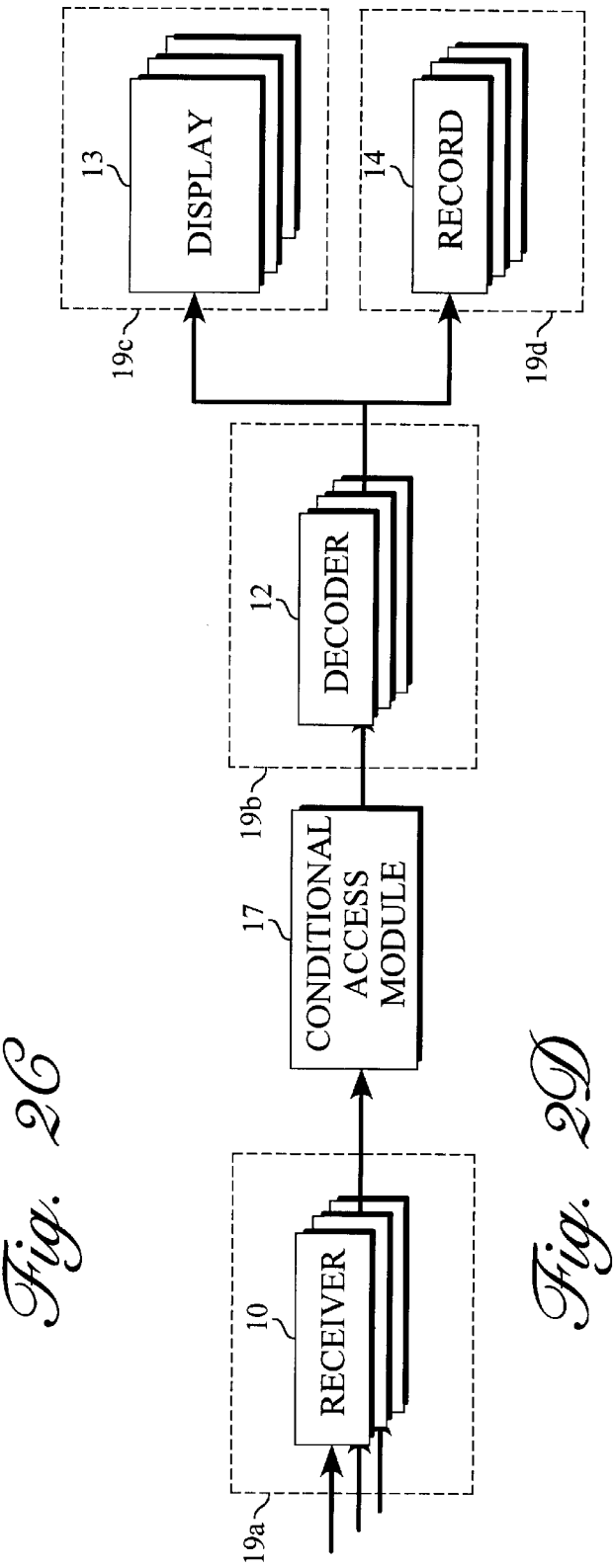
Fig. 2C
Fig. 2D

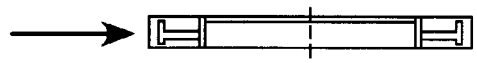
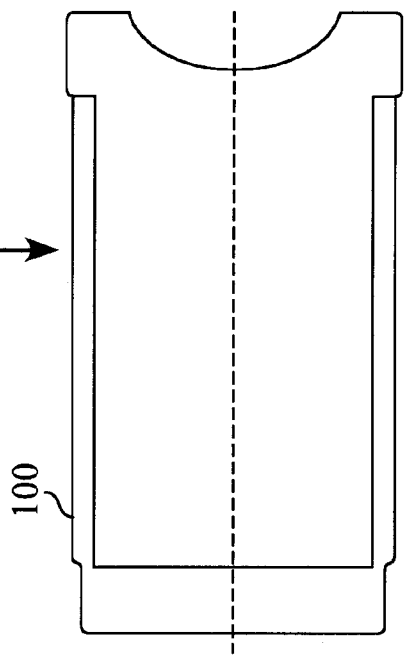

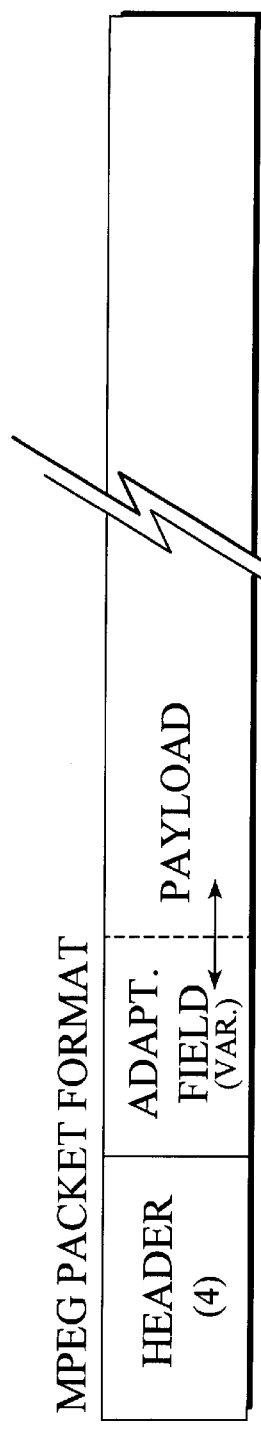
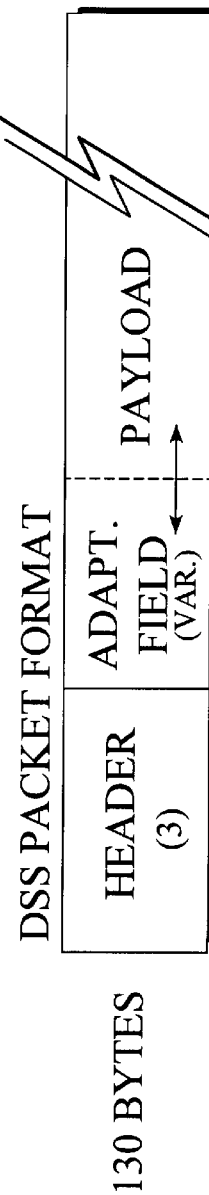
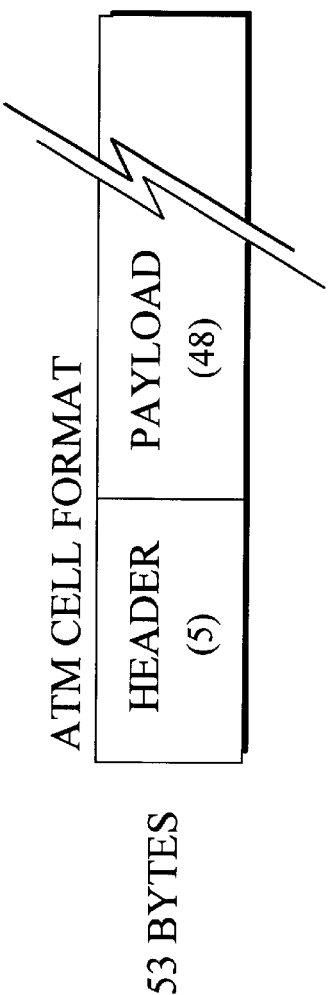
Fig. 19
Fig. 20
Fig. 21

SIGNAL FILTERING MECHANISM FOR A MULTI-PURPOSE DIGITAL TELEVISION RECEIVER

CROSS-REFERENCE TO RELATED APPLICATIONS

This application is related to the following copending patent applications: (1) Ser. No. 09/444,488, filed on even date herewith, entitled "Digital Television Conditional Access Methods and Apparatus with Multiple Data Transport Mechanism" and invented by Luc Vantalon, Arnaud Chataignier, and Christophe Genevois; (2) Ser. No. 09/444,490, filed on even date herewith, entitled "Adaptive Trans-Scrambling Mechanism for Digital Television Multiple Data Transport System" and invented by Luc Vantalon, Arnaud Chataignier, and Christophe Genevois; and (3) Ser. No. 09/444,495, filed on even date herewith, entitled "Digital Television Methods and Apparatus" and invented by Luc Vantalon, Arnaud Chataignier, and Christophe Genevois. The foregoing cross-referenced patent applications are expressly incorporated in their entirety into this application by this reference thereto.

TECHNICAL FIELD

This invention relates to digital television systems and services and particularly to signal processing methods and apparatus for use with such systems and services.

BACKGROUND OF THE INVENTION

Digital television is an emerging technology, which is becoming increasingly popular with the public. One of the more interesting aspects is the introduction of so-called "high-definition television" (HDTV), the broadcasting of which was recently approved by the United States Federal Communications Commission. HDTV will provide television images of much higher quality and definition than is provided by preexisting "conventional definition" television systems.

Another highly important aspect of digital television is the providing of related services, such as video-on-demand programming, pay-per-view movies and sporting events, interactive video games, home shopping capabilities, high-speed Internet access and the like. The home television set is fast becoming the predominate information and services dispensing medium of the future.

As is known, television services are presently communicated by land-based radio-type broadcast transmissions, cable network transmissions and space satellite transmissions. In order to limit reception to paid subscribers, it is common practice for cable and satellite providers to scramble their transmissions and to require their customers to use a special set-top control box to unscramble the received signals. Such scrambling and set-top box techniques are also desired by providers of related services. The problem to date is that each provider has developed its own unique and proprietary set-top control box. Thus, to receive and use signals from multiple providers requires the use of multiple set-top control boxes. This is not the best situation and, in order to overcome the problem, the U.S. Federal Communications Commission is encouraging a so-called "open" set-top box approach for providing a universal set-top box capable of receiving and handling content from multiple providers. Unfortunately, this is not an easy thing to do and at the same time provide the security control features needed to protect the various service providers from loss of services to unauthorized users.

As the demand for television related services increases, the communications requirements between the user's television receiver equipment and the central broadcasting station becomes more and more complex. More communications channels are needed for passing the necessary television signals, information signals and control signals from the central broadcasting station to the end user. This problem is further complicated by the need for the security control features to prevent unauthorized use of services. More control signals and security related information need to be communicated. Thus, there is an increasing need for transmitting more and more data and information for different uses and purposes, some in a continuous manner and some in an occasional or intermittent manner. Thus, there is a need for improved methods for transmitting information for different applications and end uses over a limited number of signal channels. And there is a corresponding need to provide better ways of receiving and distributing the information to the different end uses at the receiving end of the system.

SUMMARY OF THE INVENTION

The present invention provides a new and improved digital filtering mechanism for separating signal segments intended for different applications and end uses. This filtering mechanism includes input circuitry for receiving a digital signal stream comprised of digital data bytes. A digital pattern selection mechanism provides a way of pre-filtering data bytes according to their relative position. The programmable filtering mechanism provides a way of filtering data bytes according to their successive values. The present invention further allows distributing the total amount of reference data bytes to be matched, into a programmable number of parallel independent filtering sub-mechanisms. The more filtering sub-mechanisms are activated, the shortest their reference sequence is. While one of the sub filtering mechanism is matching its reference sequence, it provides a match indication signal. A data extraction mechanism is responsive to the match indication signal for transferring a corresponding group of received data bytes to an end use location assigned to the end use identified by the digital signal pattern, which produced the match.

There is also described a private recording feature for making and using a private copy of the received signals. This is accomplished by scrambling the signals in accordance with a private cipher key before they are recorded and thereafter descrambling the recorded signals in accordance with this same private cipher key when they are played back.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIGS. 2A–2D show different ways of packaging the apparatus of FIG. 1;

FIG. 16 is a plan view of one form of PCMCIA Smart Card reader that may be used with the present invention;

FIG. 16A is a left end view of the FIG. 16 card reader;

FIG. 16B is a right end view of the FIG. 16 card reader;

FIG. 16C is a side view showing one side of the card reader of FIG. 16;

FIGS. 19, 20 and 21 show the packet formats for different types of data transport streams that may be handled by the present invention;

DETAILED DESCRIPTION OF THE ILLUSTRATED EMBODIMENTS

Figure 1:
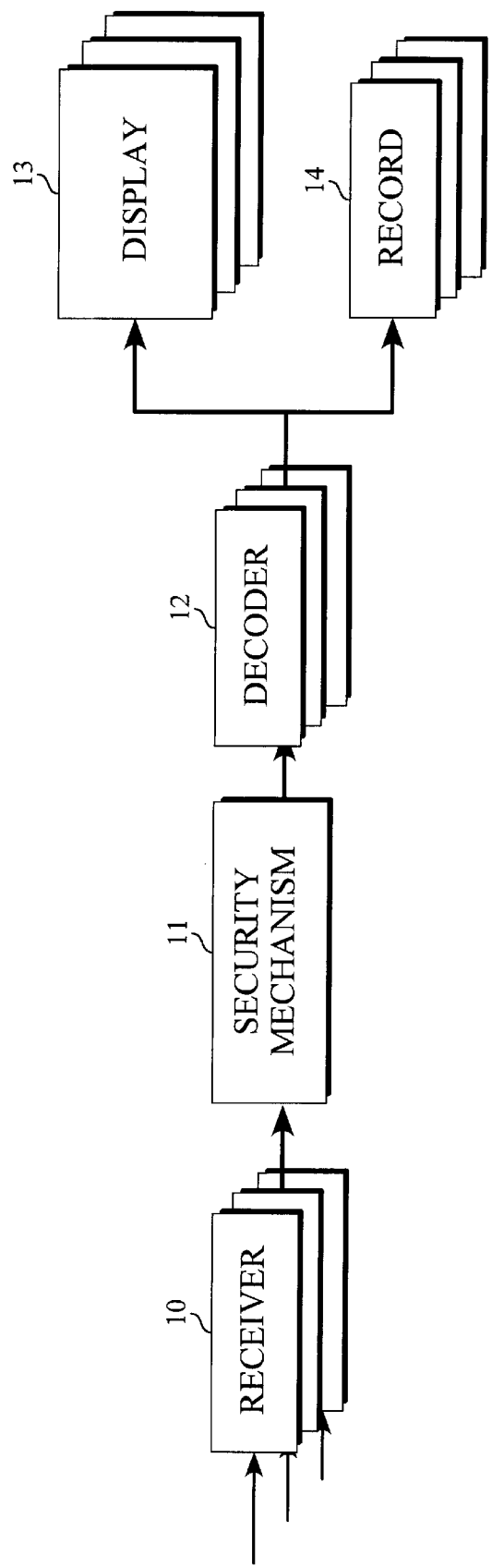
FIG. 1 is a general block diagram of a digital television receiving system with a security mechanism for preventing unauthorized display of the transmitted images.

Referring to FIG. 1, there is shown a general block diagram of a digital broadband receiving system having one or more receivers 10 connected to one or more broadband signal transmission networks. Typical signal transmission networks include land-based radio-frequency type broadcast networks, cable networks, space satellite signal transmission networks, broadband telephone networks, etc. The analog information signals intended for transmission (for example: video signals, audio signals, or data signals) are converted to specific digital transport stream formats for transmission purposes. Typical transport stream formats are the MPEG format, the DSS format and the ATM format. The MPEG format is the data transmission format developed by the Motion Picture Expert Group. A preferred form of MPEG is MPEG-2, which is defined in ISO/IEC Standard 13818. The acronym "DSS" stands for Digital Satellite Systems and refers to a format developed for use in transmitting digital signals used by some satellite operators. The acronym "ATM" stands for Asynchronous Transfer Mode. It is a digital network protocol for efficient transport of both fixed rate and bursty information in broadband digital networks. The ATM digital stream consists of fixed length packets called "cells."

Each receiver 10 demodulates its received signal and supplies the demodulated signal to a security mechanism 11. Security mechanism 11 selects one or more of the received signal transport streams and removes the network distribution security layers therefrom, provided the end user is entitled to receive the signals. Network security mechanism 11 also applies content protection to any of the signal streams that require it. The resulting signals are supplied to decoders 12 which select one or more of the signal streams and decodes each selected stream to recreate the desired video, audio and data signals which are, in turn, supplied to one or more display units 13 and one or more recording units 14. Typical display units include television sets and television and computer monitors. Typical recording units include VCR-type video recorders and various types of computer memory units. Security mechanism 11 examines the received signal or signals and determines their types and controls their descrambling. Security mechanism 11 allows access to an unscrambled version of the received signal, provided the required conditions are met.

In addition to regular digital television programming, the receiving system of FIG. 1 also receives and handles various related communications services. Examples of related services are video-on-demand programming, pay-per-view movies and sporting events, interactive video games, home shopping services, high-speed Internet access, and the like. As will be seen, the data signals and control signals for these related services can be supplied across a cable network by way of a so-called "out-of-band" channel.

Figure 2A:
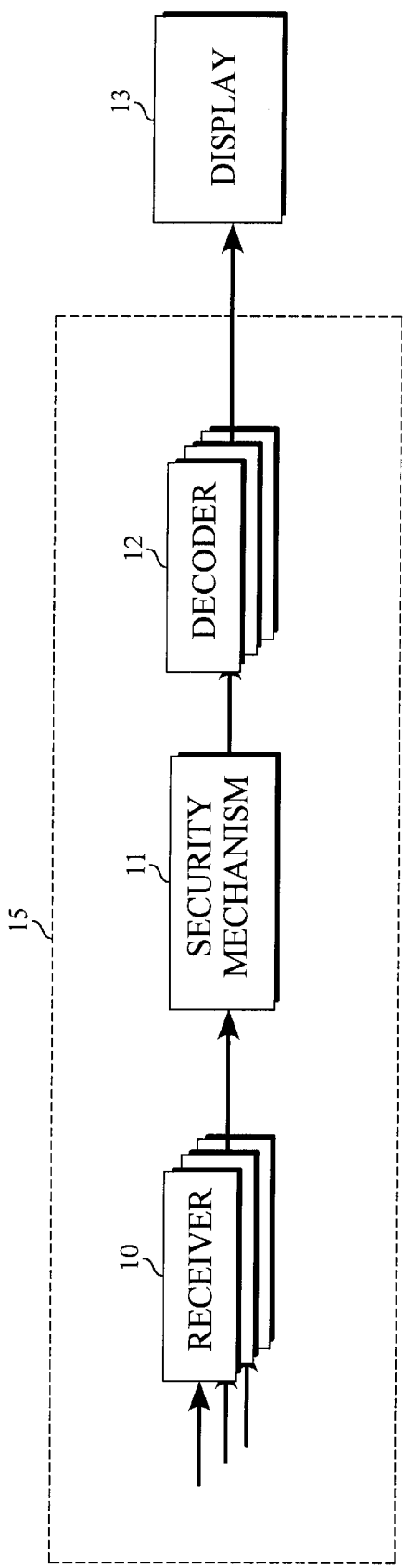

FIGS. 2A–2D show different ways of packaging the apparatus of FIG. 1. In particular, FIG. 2A shows the case where the receivers 10, security mechanism 11 and decoders 12 are located within a network specific set-top box 15. In one case, the security mechanism 11 is embedded within or permanently mounted within the set-top box 15. In a typical use, the set-top box 15 sits on top of the display unit 13.

Figure 2B:
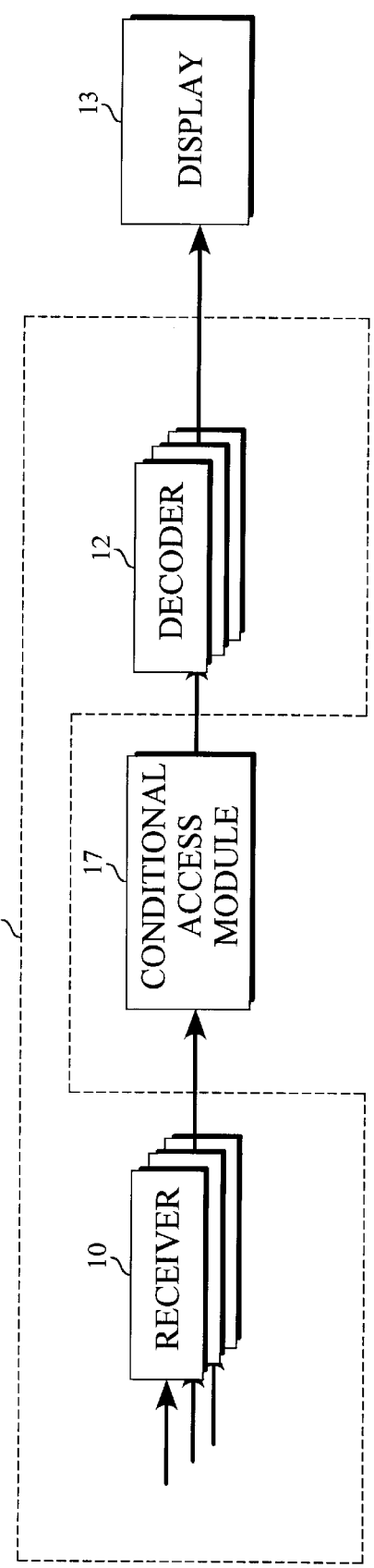

FIG. 2B shows an open-type set-top box 16 with a renewable and removable add-on security mechanism represented by a conditional access module (CAM) 17. Conditional access module 17 performs the security functions provided by the security mechanism 11 of FIG. 2A. Conditional access module 17 is a removable plug-in type element which is adapted to be plugged into a cooperating receptacle or socket in the host set-top box 16. As in FIG. 2A, set-top box 16 is designed to sit on top of the display unit 13.

FIG. 2C shows the case where the set-top box functions are located inside the cabinet 18 of a television receiver, that is, the cabinet, which houses the display unit or picture tube 13. The conditional access module 17 is adapted to plug into a cooperative receptacle, which is accessible from the outside of the cabinet 18. FIG. 2C represents an integrated television set with a renewable, add-on security mechanism represented by the conditional access module 17.

FIG. 2D represents the case where the primary units are located in separate component-type cabinets or boxes 19a–19d. The conditional access module 17 may be removably plugged into the receiver box 19a or the decoder box 19b or may, instead, be part of a small connector unit which is connected between boxes 19a and 19b. The configuration of FIG. 2D would be particularly useful in a component-type entertainment center, where each component is connected by the way of a home digital private network.

Figure 3:
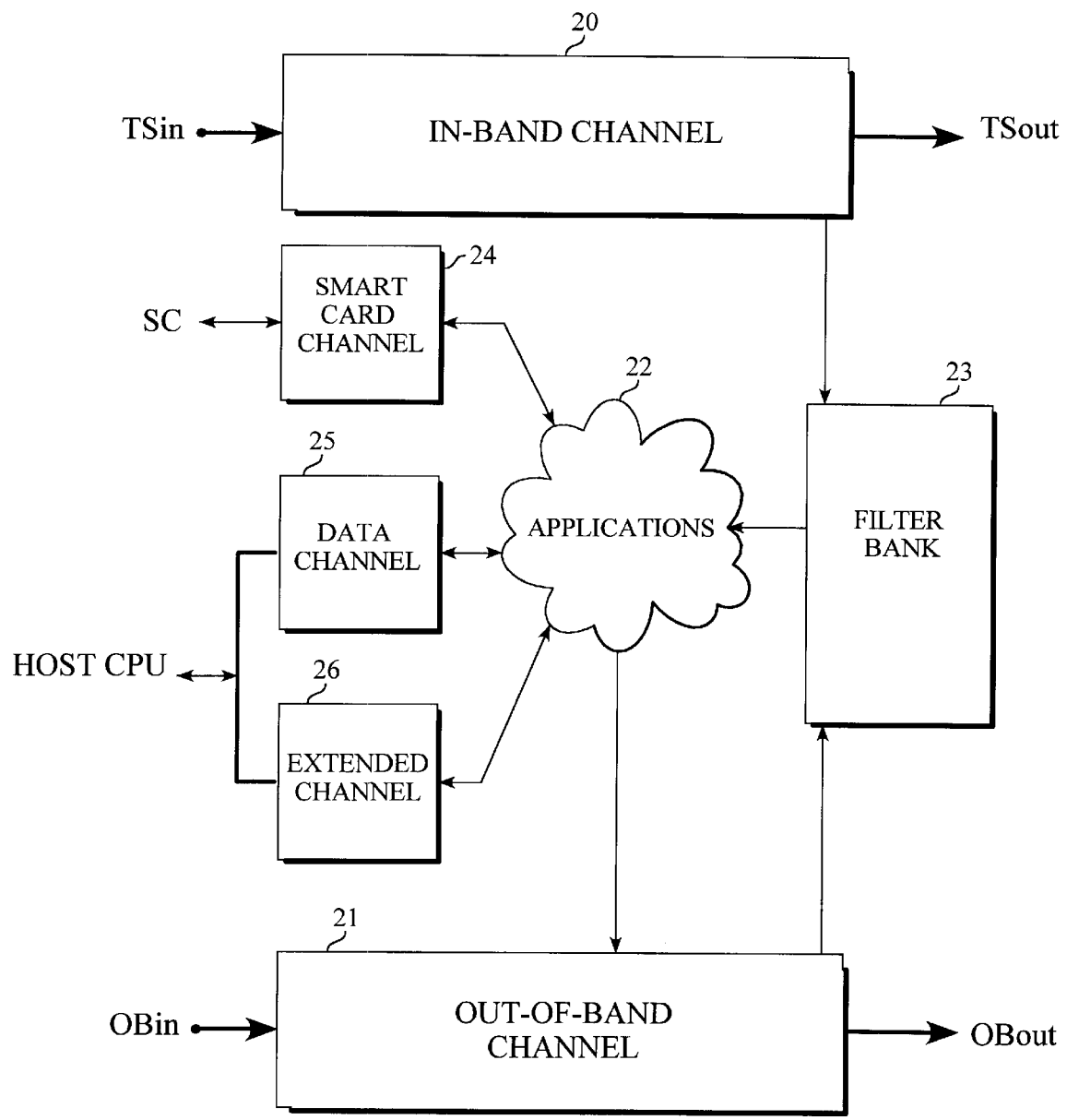
FIG. 3 is a conceptual diagram for one embodiment of the present invention.

Referring to FIG. 3, there is shown a conceptual diagram for one embodiment of the present invention. As there seen, the receiving apparatus includes an in-band channel 20 and an out-of-band channel 21, which are adapted to receive incoming signals from a remote cable head-end. The in-band channel 20 handles the primary user signals, such as the digital television signals. The out-of-band channel 21, on the other hand, handles the digital signals for the related services, such as video-on-demand commands, security data, e-commerce transactions, etc. Both of channels 20 and 21 communicate with various application programs 22 by way of a filter bank 23 which detects various defined digital patterns within the received signals and reacts thereto for establishing connections with the appropriate ones of applications 22.

The apparatus of FIG. 3 also includes a smart card channel 24 for providing communications between a smart card SC and the applications programs 22. A data channel provides communications between a CPU (Central Processing Unit) located in the host unit, for example, set-top box (STB) 16, and the application programs 22. An extended channel 26 is provided to transfer network data over the out-of-band channel from the network to the host CPU or vice versa.

Figure 4:
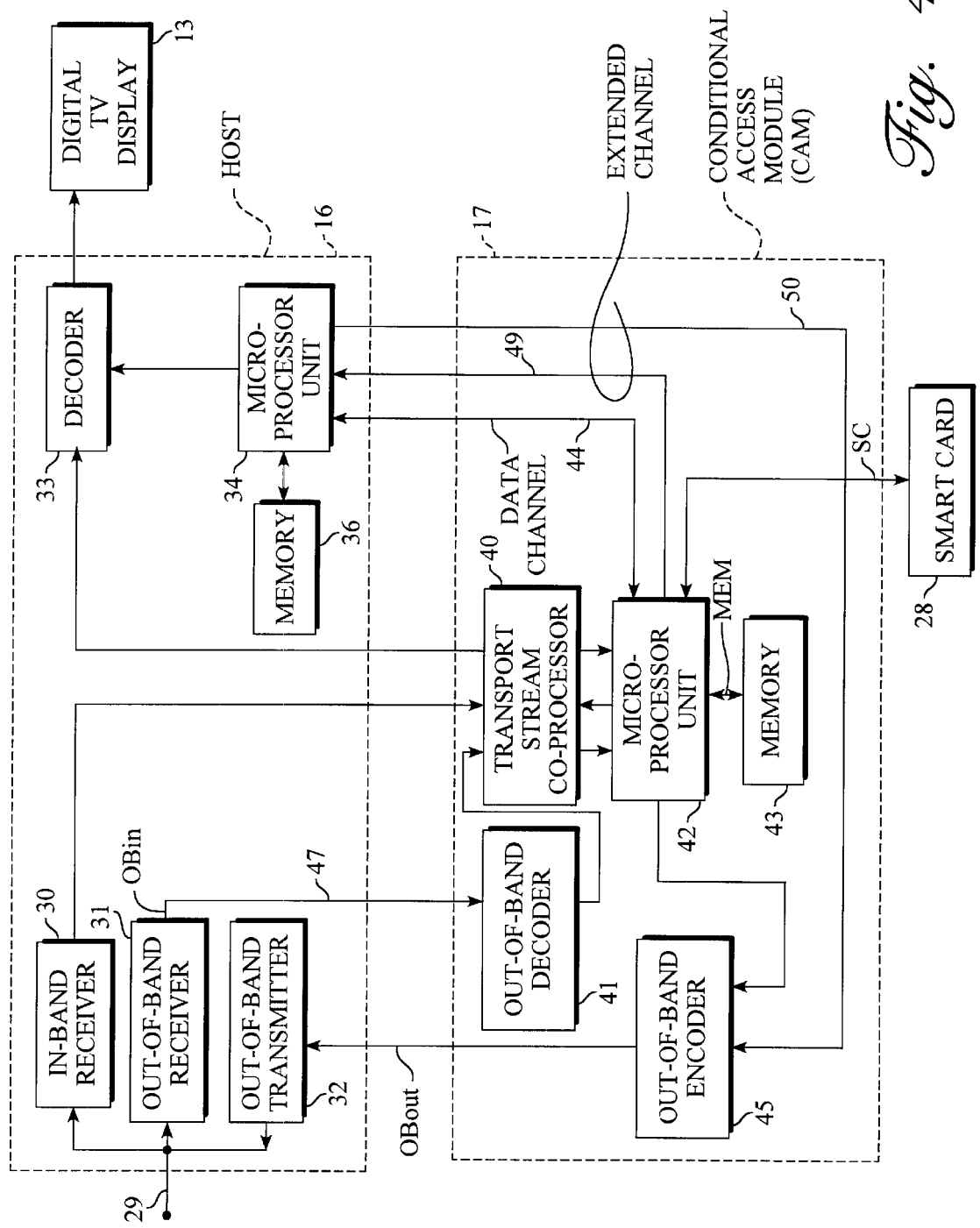
FIG. 4 shows in greater detail a representative form of internal construction for the set-top box and the conditional access module of FIG. 2B.

Referring to FIG. 4 there is shown in greater detail a representative form of internal instruction for the host unit or set-top box 16 and the conditional access module 17 of FIG. 2B. As seen in FIG. 4, a signal connector 29 connects the set-top box 16 to the communications network supplying the signals. This signal path 29 runs to an in-band receiver 30 and an out-of-band receiver 31. The communications network is a multi-channel system and the channel conveying the primary video and audio signals is labeled as the "in-band" channel and the channel which carries the signals for the related services is called the "out-of-band" channel. The set-top box 16 further includes an out-of-band transmitter 32 for transmitting signals back to the digital data provider located at the network broadcasting center.

The digital signals appearing at the outputs of receivers 30 and 31 are supplied to the conditional access module 17. The primary video and audio signals are supplied back to a decoder 33 in the set-top box 16 and from there to the digital TV display 13. The set-top box 16 includes a microprocessor unit 34, which, among other things, provides control signals to the decoder 33. A memory unit 36 is coupled to the microprocessor unit 34 and, among other things, provides storage for various control routines and application program functions utilized by the microprocessor unit 34. Microprocessor unit 34 and memory 36 provide a CPU function for the set-top box 16.

The conditional access module (CAM) 17 of FIG. 4 includes a transport stream (TS) co-processor 40 which receives the output digital signals from the in-band receiver 30 and the out-of-band receiver 31, the latter being supplied by way of an out-of-band decoder 41. Transport stream co-processor 40 also supplies the digital video and digital audio signals, which are intended for the TV display 13 to the decoder 33. Conditional access module 17 further includes a microprocessor unit 42 and an associated memory unit 43. These units 42 and 43 provide a CPU function for the conditional access module 17. The primary portion of the application programs 22 is stored in the memory 43. A data channel 44 provides a direct communications link between the CAM microprocessor unit 42 and the set-top box microprocessor unit 34. The CAM microprocessor unit 42 can also send digital messages and information back to the cable network head-end center. This is done by way of an out-of-band encoder 45 and the out-of-band transmitter 32 in the host set-top box 16. A removable smart card 28 is adapted to be connected to the microprocessor unit 42 for supplying secured information thereto.

An extended channel is provided for enabling the cable network head-end center to communicate with the host microprocessor unit 34 and vice-versa. The incoming branch of this extended channel includes a signal path 47 coupled to the out-of-band receiver 31 and extending to the out-of-band decoder 41. This incoming branch includes the decoder 41, transport stream co-processor 40, microprocessor 42 and a further signal path 49 which runs from the microprocessor 42 to the host microprocessor 34. The outgoing branch of this extended channel is provided by a signal path 50, which runs from the host microprocessor 34 directly to the out-of-band encoder 45.

Figure 5:
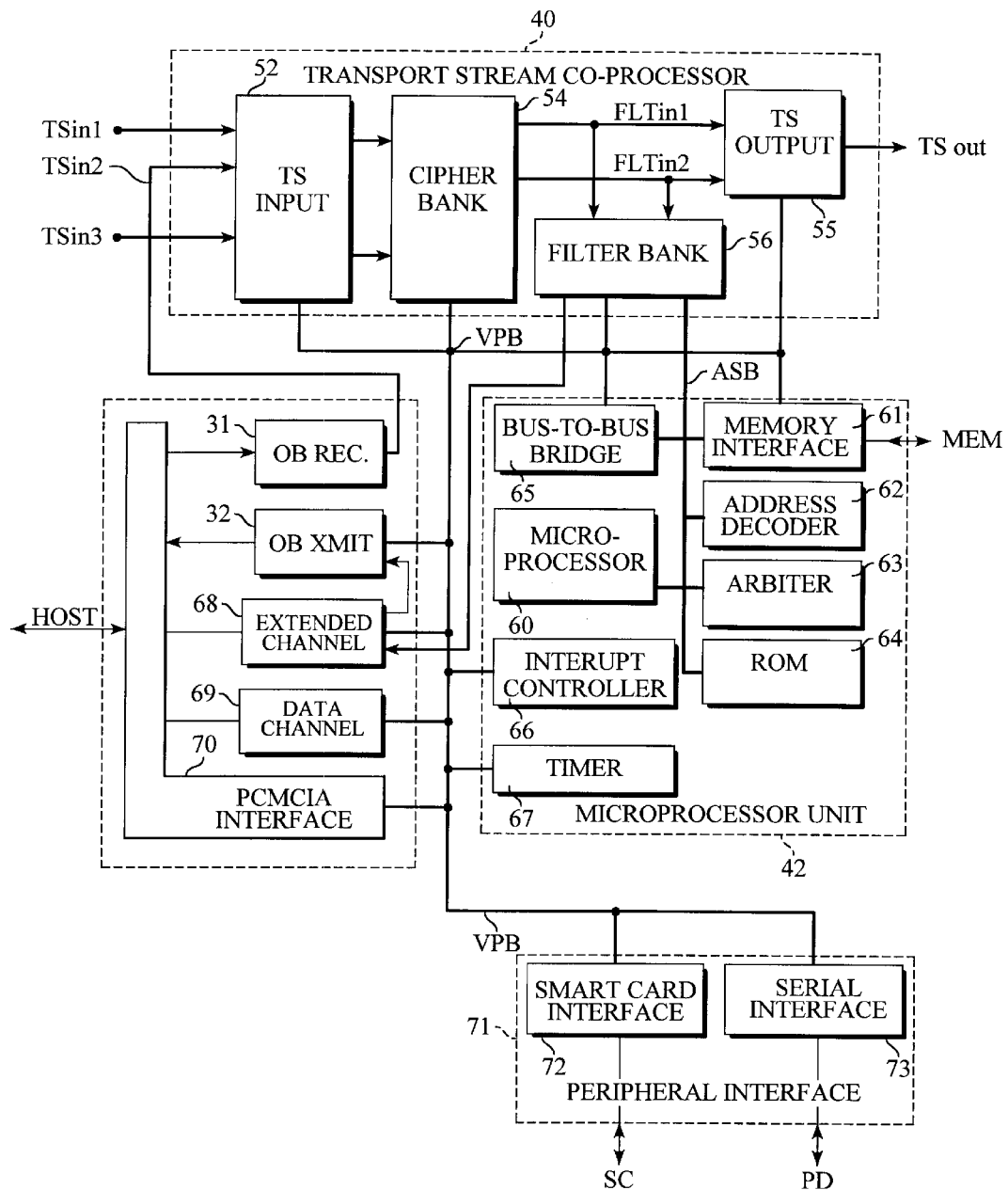
FIG. 5 is a detailed block diagram for the transport stream co-processor and the microprocessor unit of the conditional access module of FIG. 4.

Referring to FIG. 5, there is shown a detailed block diagram for the transport stream (TS) co-processor 40 and the microprocessor unit 42 of the conditional access module (CAM) 17 of FIG. 4. As seen in FIG. 5, the transport stream (TS) co-processor 40 includes a transport stream (TS) input unit 52 which receives parallel-type digital input signals TSin1 and TSin2 from the in-band receiver 30 and the out-of-band receiver 31, respectively. A serial-type digital signal TSin3 is also available for further extensions. The output signals from the input unit 52 are supplied to a cipher bank 54 for further processing. Cipher bank 54 produces two parallel type output streams, which are connected to the inputs of a TS output unit 55 and a filter bank 56. By multiplexer selection within the cipher bank 54, one of the two input streams to the cipher bank 54 is processed by an internal cipher processor, while the other input stream is simply bypassed to the TS output unit 55 and the filter bank 56. The TSout signal from TS output unit 55 is supplied to the decoder 33 in the set-top box 16.

The transport stream input unit 52 includes a multiple data transport mechanism capable of receiving a plurality of different transport stream formats. In particular, it includes a qualifying mechanism for receiving and qualifying incoming data bytes according to their positions and values in their plural-byte data packets. TS input unit 52 further includes a tagging mechanism for assigning a plural-bit tag to each data byte, such tag having a unique value determined by the results of the qualifying process. The tag bits are used to facilitate the further processing of the data bytes.

The microprocessor unit 42 includes an ARM7 microprocessor 60, which is connected to a 32-bit ARM system bus ASB, which typically operates in a high-speed transfer mode. Also connected to the ASB bus are a memory interface unit 61, an address decoder unit 62, an arbiter unit 63, and a read only memory (ROM) unit 64. Memory interface 61 is connected to the external memory 43 associated with the microprocessor unit 42.

The microprocessor 60 communicates with the transport stream coprocessor 40 and various other units by means of a peripheral bus VPB. This VPB bus is connected to the microprocessor 60 by way of a bus-to-bus bridge unit 65 and the high-speed ASB bus. The ASB bus is used for fast transfers and the VPB bus is used for communications with a lower priority. As the filter bank 56 of co-processor 40 needs a direct and fast access to the external memory 43 for its output data, it is also connected to the ASB bus. As a consequence, there are three masters on the ASB bus, namely, the microprocessor 60 and the two channels of the filter bank 56. The arbitration between these masters is managed by the arbiter unit 63. By way of comparison, the VPB bus has only a single master, namely, the microprocessor 60.

The address decoder 62 decodes the address bits on the ASB bus to select the right target for the data on the ASB bus. Typical targets are the memory interface 61, ROM 64 and the various peripherals and other units connected to the ASB bus. An interrupt controller 66 provides the interrupt function for the microprocessor 60, while a timer 67 provides various timing functions. Each of the units in the transport stream co-processor 40 is coupled to the lower priority VPB bus for control and status purposes. Also coupled to the VPB bus are an extended channel unit 68, a data channel unit 69 and a PCMCIA interface 70. A peripheral interface unit 71 provides an interface between the VPB bus and one or more peripheral devices. For example, a smart card interface connector structure 72 is provided for making connection with a removable smart card 28 shown in FIG. 4. A serial interface 73 may be provided for connecting to a serial type peripheral device PD.

Figure 6:
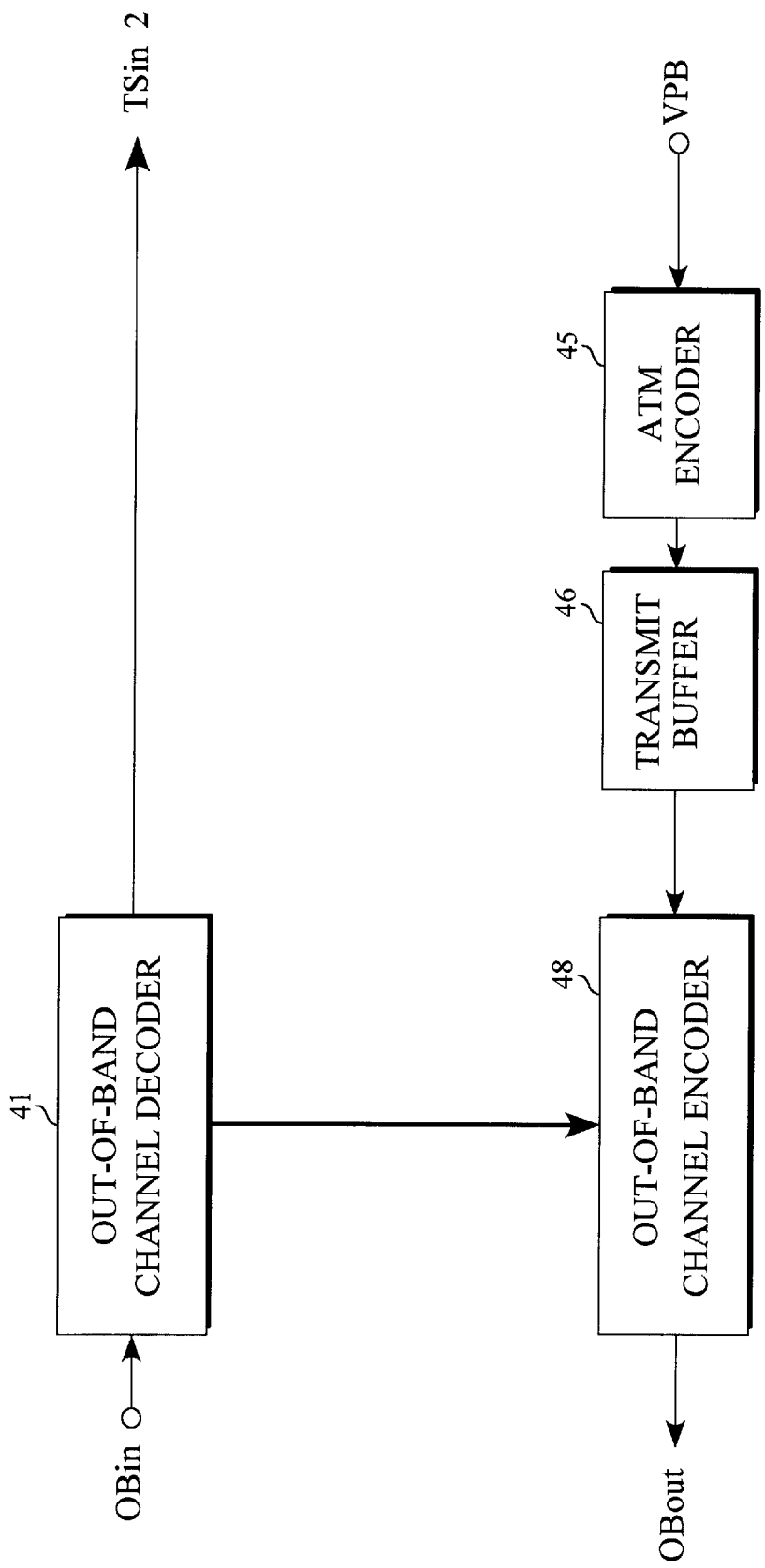
FIG. 6 shows a representative form of construction for an out-of-band channel feature of the present invention.

FIG. 6 shows a representative form of construction for an out-of-band channel feature of the present invention. This out-of-band channel feature includes an out-of-band channel decoder 41, which receives the out-of-band signal OBin from the out-of-band receiver 31 shown in FIG. 4. The output of decoder 41 is supplied byway of the transport stream co-processor 40 for further filtering operations. The outgoing or transmitter portion of the out-of-band channel includes ATM encoder 45, transmit buffer 46 and a channel encoder 48 which supplies the out-of-band output signal OBout to the out-of-band transmitter 32 shown in FIG. 4. The ATM encoder 45 receives its input signal from the VPB peripheral bus associated with the microprocessor unit 42. The data to be transmitted is supplied by either the application programs located in the microprocessor unit 42 or the data received from the set-top box 16 by way of the extended channel path 50 shown in FIG. 4. This data is segmented into ATM cells by the ATM encoder 45. These cells are temporarily stored in a buffer 46. When, the conditional access module 17 is authorized to transmit according to the network protocol, the transmit buffer 46 is emptied by channel encoder 48 and is transmitted by way of out-of-band transmitter 32 to the cable network head-end center.

Figure 7:
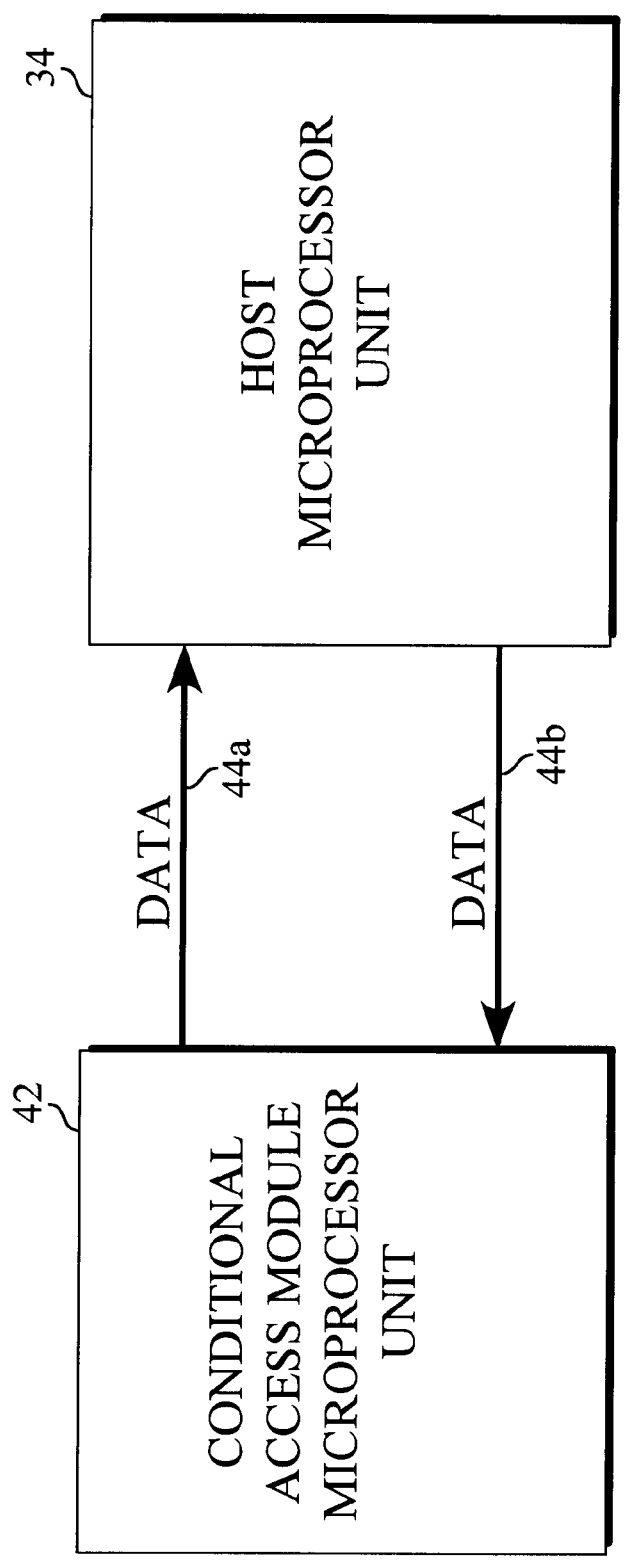
FIG. 7 shows a representative form of construction for a microprocessor-to-microprocessor data channel feature of the present invention.

FIG. 7 shows a microprocessor-to-microprocessor data channel feature of the present invention. This feature enables the CAM microprocessor unit 42 to communicate directly with the host microprocessor unit 34 and vice-versa. Microprocessor unit 42 sends data to the microprocessor unit 34 by way of data channel 44*a*. The host unit 34 sends data to the CAM microprocessor 42 by way of data channel 44*b*.

Figure 8:
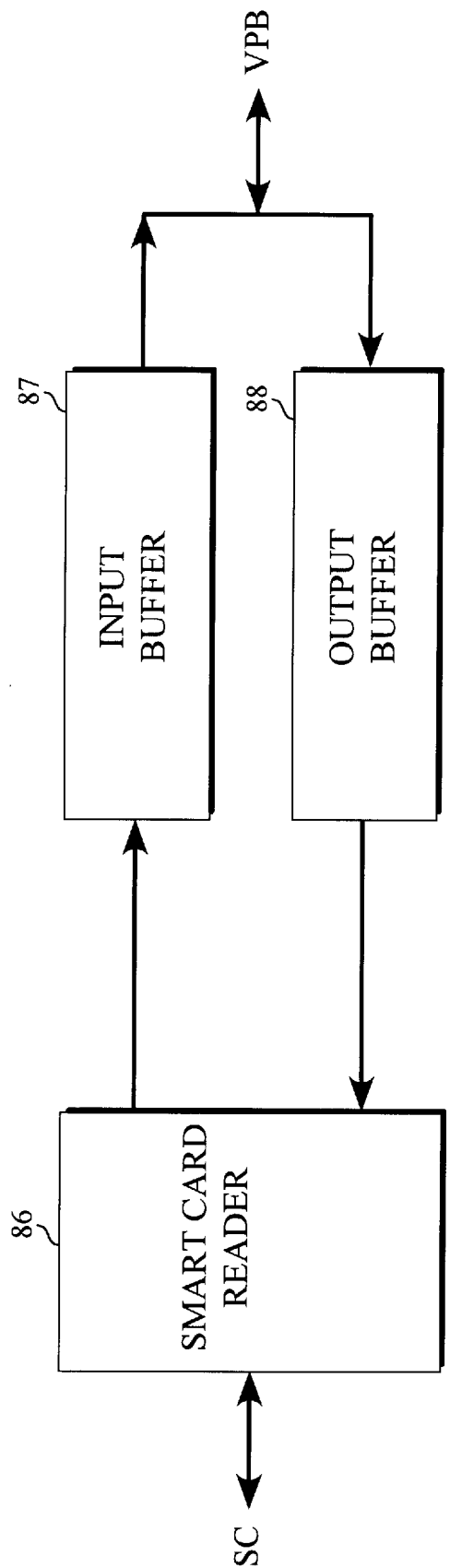
FIG. 8 shows a representative form of construction for a Smart Card channel feature of the present invention.

FIG. 8 shows the details of the smart card interface 72 of FIG. 5. The smart card 28 is adapted to be inserted into a smart card reader 86 and the data received from the smart card 28 is supplied by way of an input buffer 87 to the peripheral bus VPB associated with the microprocessor unit 42. Data from the microprocessor unit 42 is supplied by way of the VPB bus, output buffer 88 and the smart card reader 86 to the smart card 28.

Figure 9:
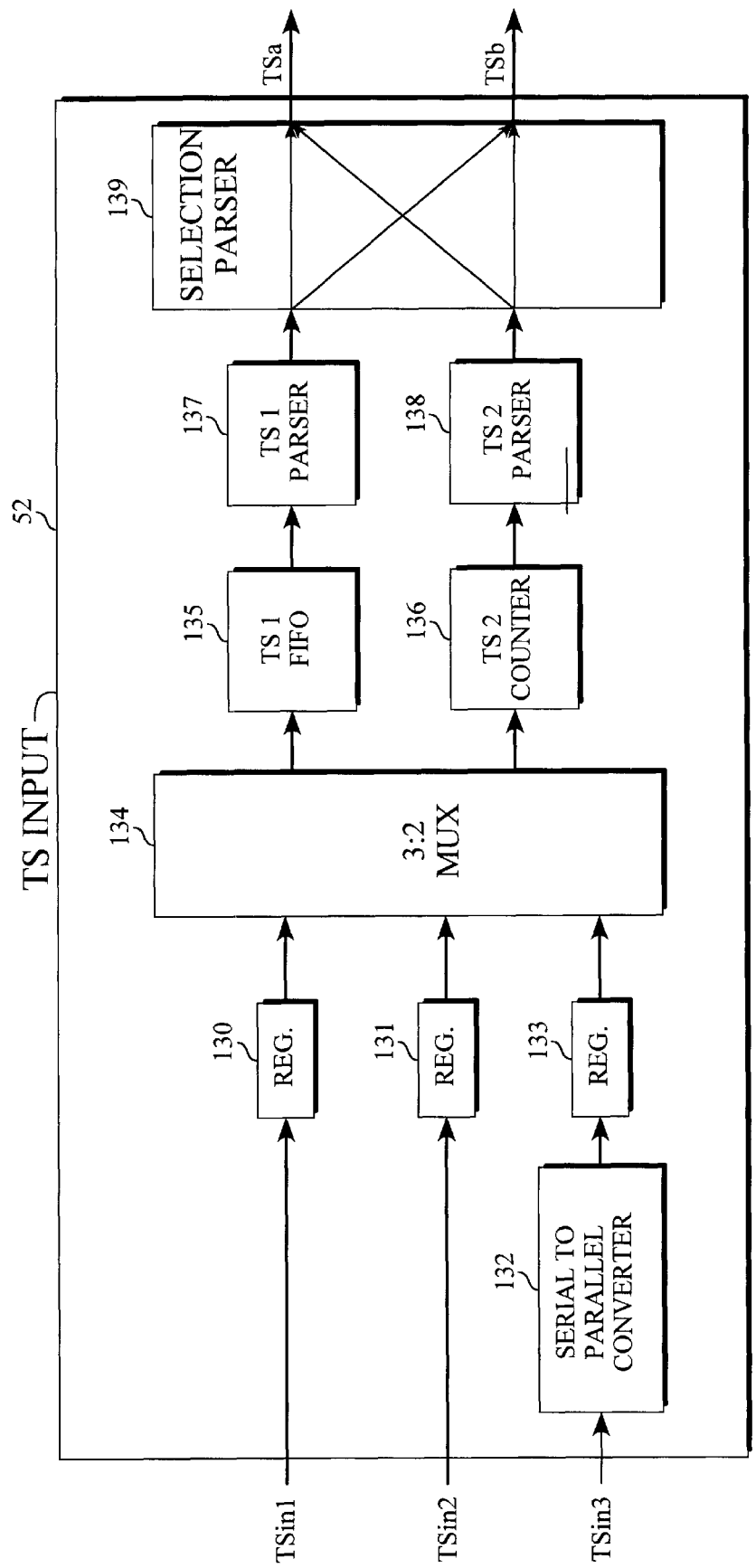
FIG. 9 shows a representative form of construction for the transport stream (TS) input unit of FIG. 5.

Referring now to FIG. 9 there is shown in greater detail a representative form of construction for the transport stream input unit 52 of FIG. 5. The TSin1 and TSin2 signals are supplied to input registers 130 and 131. The serial input signal TSin3 is supplied to a serial-to-parallel converter 132, which converts same from serial form to parallel form. The parallel output of converter 132 is supplied to a further input register 133. The outputs of registers 130, 131, and 133 are connected to a three-to-two multiplexer 134. This multiplexer 134 selects two out of the three inputs and supplies one of the selected inputs to a TS1 FIFO unit 135 and the other of the selected inputs to a TS2 counter unit 136. FIFO 135 provides the input for a TS1 parser 137, while the counter 136 provides the input for a TS2 parser 138. Parsers 137 and 138 analyze their respective signal streams on a byte-by-byte basis and assign a plural-bit tag to each data byte. More particularly, each of parsers 137 and 138 includes a qualifying mechanism for receiving and qualifying incoming data bytes according to their positions and values in their plural-byte data packets. In a representative embodiment, a 5-bit tag is generated for and attached to each data byte. The value of this 5-bit tag is determined by the qualifying process performed by the qualifying mechanism. Parsers 137 and 138 are, in turn, connected to a selection parser 139 which determines the particular output path, TSa or TSb, to which each data stream is connected.

Figure 10:
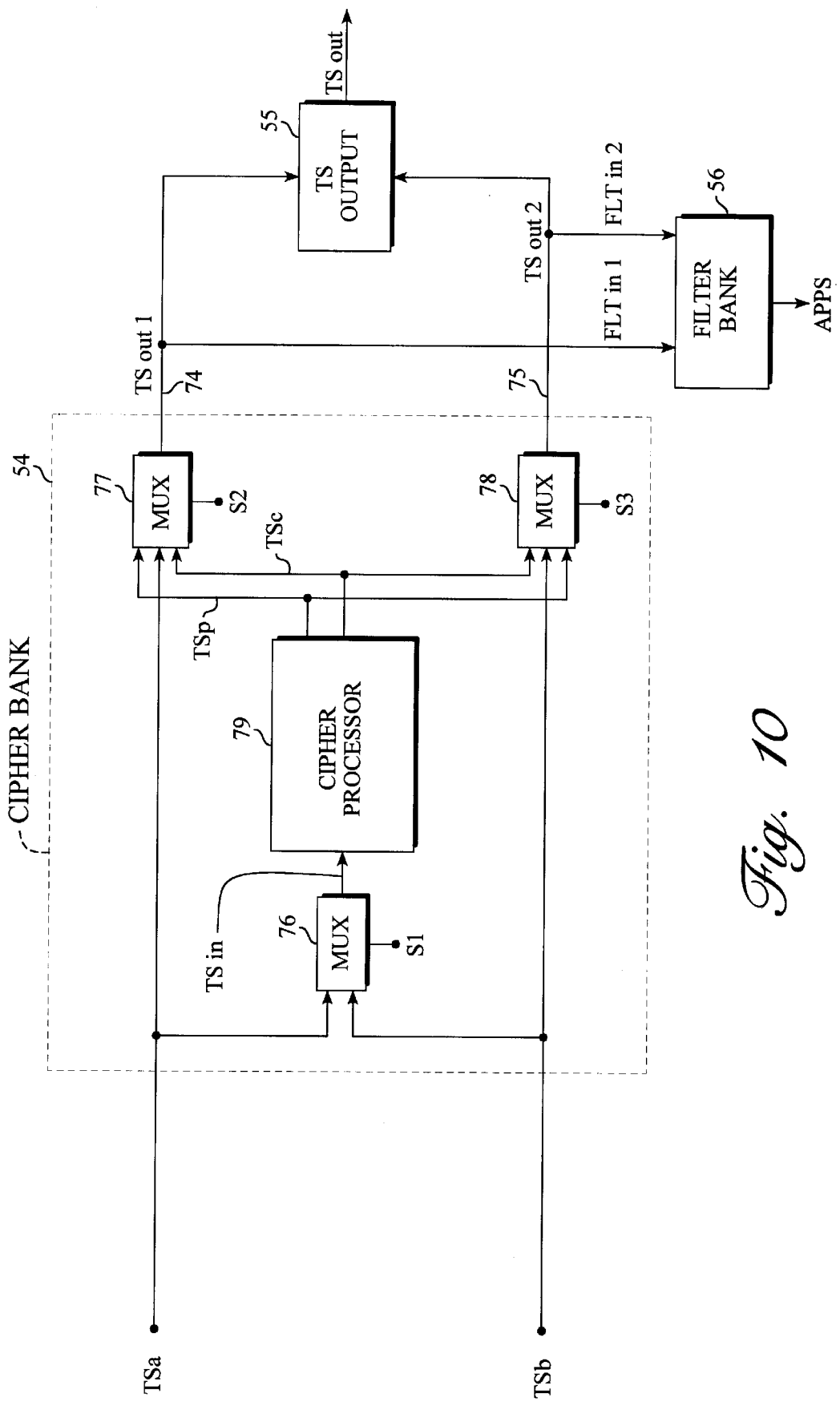
FIG. 10 shows in more detail a representative form of construction for the cipher bank unit of FIG. 5.

Referring to FIG. 10, there is shown in more detail a representative form of construction for the cipher bank 54 of FIG. 5. Cipher bank 54 receives the two signal streams TSa and TSb from the TS input unit 52 of FIG. 9. The two output buses 74 and 75 from cipher bank 54 are connected to the TS output unit 55 and the filter bank 56. Thus, the cipher bank 54 has two input streams and two output streams. By selection via multiplexers 76, 77, and 78, one of the input streams is processed by a cipher processor 79, while the other input stream is simply bypassed to the output of its corresponding one of multiplexers 77 and 78. Multiplexers 76, 77 and 78 are controlled by selection signals S1, S2 and S3, respectively, obtained by way of the VPB bus.

For a first set of multiplexer settings, the TSa data stream is transferred by way of multiplexer 76 to the cipher processor 79 and the output of cipher processor 79 is transferred by way of multiplexer 77 to the TSout1 bus 74 of the cipher bank 54. For this same case, the second input data stream TSb, is supplied by way of multiplexer 78 to the TSout2 bus 75.

For the second set of multiplexer settings, the situation is reversed. The TSb data stream is supplied by way of multiplexer 76 to the cipher processor 79 and the resulting processed signal is supplied by way of multiplexer 78 to the TSout2 bus 75. In this second case, the TSa input data stream is supplied by way of multiplexer 77 to the TSout1 bus 74. Cipher processor 79 outputs both a protected data stream TSp and a clear data stream TSc. Multiplexers 77 and 78 select one or the other, but not both of these data streams.

Figure 11:
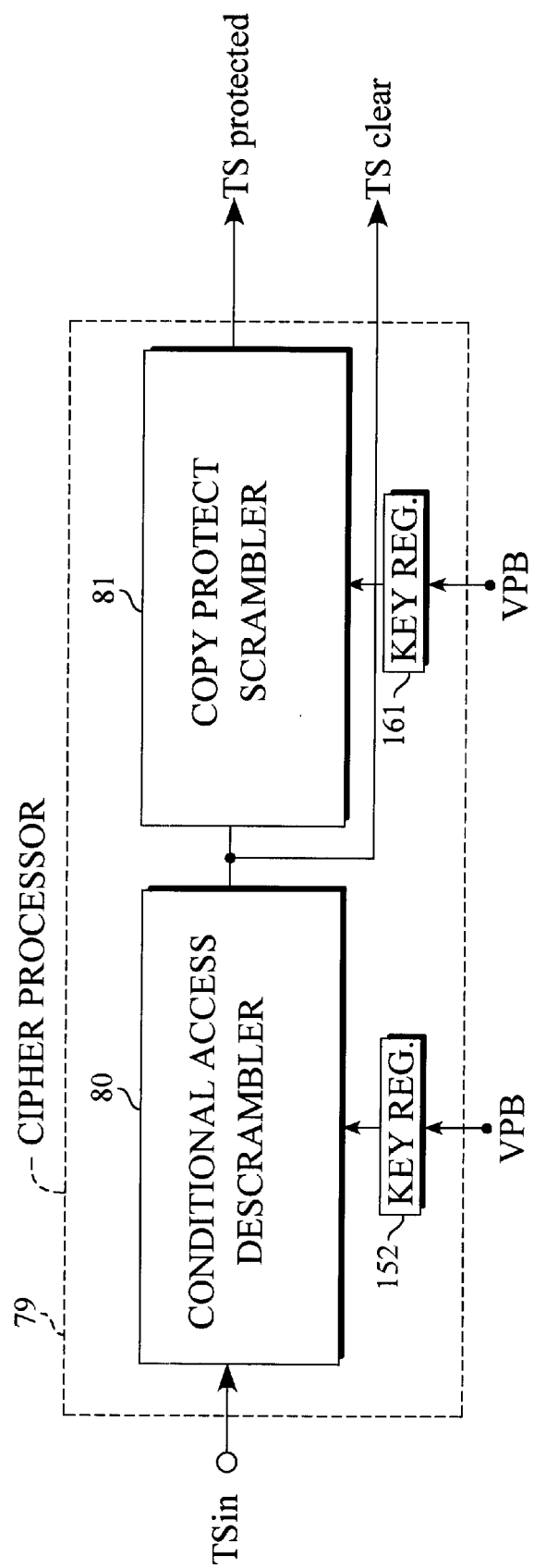
FIG. 11 shows a general form of construction for the cipher processor of FIG. 10.

Referring to FIG. 11, there is shown the primary elements of the cipher processor 79 of FIG. 10. As seen in FIG. 11, cipher processor 79 includes a conditional access descrambler 80 and a copy protection scrambler 81. Descrambler 80 descrambles a scrambled incoming digital signal to produce a clear copy output signal TSclear. Descrambler 80 is capable of descrambling the following encryption formats: the DVB super scrambling format used in Europe, the DES and 3DES data encryption standard formats which are used in the United States, and the MULTI2 format which is used in Japan. The copy protect scrambler 81 is used to rescramble the clear copy signal at the output of descrambler 80 to preclude the data content from being stolen at the output of the conditional access module 17. Scrambler 81 uses the DES data encryption standard scrambling method.

Figure 12:
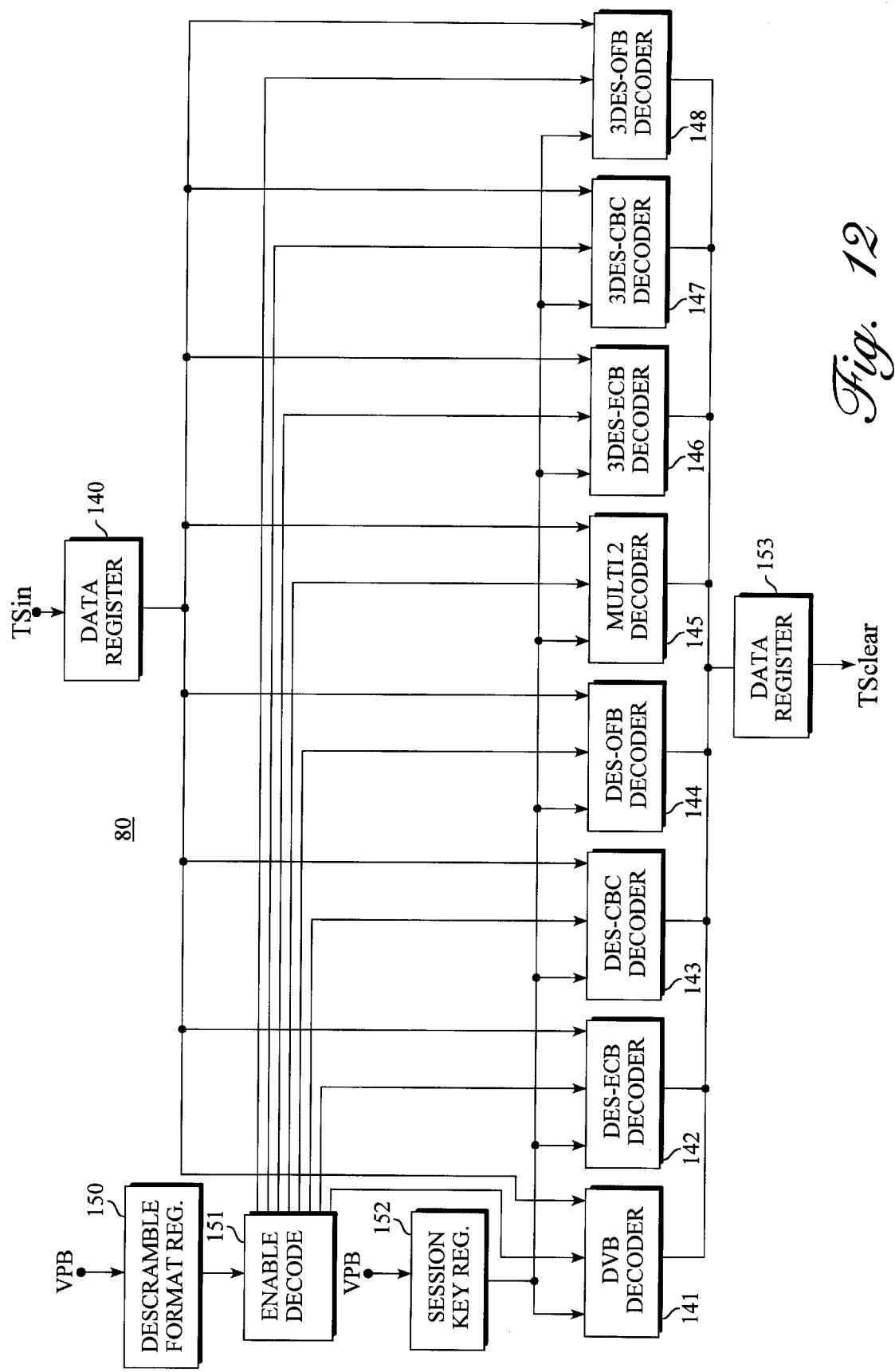
FIG. 12 shows the details of a representative form of construction for the conditional access descrambler of FIG. 11.

FIG. 12 shows the details of a representative form of construction for the conditional access descrambler 80 of FIG. 11. The descrambler 80 of FIG. 12 includes an input data register 140 for receiving the TSin data stream from the multiplexer 76 of FIG. 10. Descrambler 80 also includes a set of eight decoders 141–148 for descrambling any one of the following encryption formats: DVB, DES-ECB, DES-CBC, DES-OFB, MULTI2, 3DES-ECB, 3DES-CBC and 3DES-OFB. Other encryption formats can be accommodated by providing appropriate additional decoders. The foregoing acronyms have the following meanings:

| ACRONYM | DESCRIPTION |
| --- | --- |
| DVB | Digital Video Broadcasting (Europe) |
| DES | Data Encryption Standard (U.S.) |
| ECB | Electronic Code Book |
| CBC | Chain Block Cipher |
| OFB | Output Feedback Block |

The ECB, CBC and OFB formats are known variations of the DES and 3DES formats.

A descramble format register 150 and an associated decoder 151 determine which ones of the primary decoders 141–148 are activated to process the incoming data stream. Descramble format register 150 is loaded by way of the VPB bus with a plural-bit control signal which designates the decoder to be used. This control signal is decoded by the enable signal decoder 151 to activate one or many of its output lines. Thus, only the selected ones of the decoders 141–148 are activated or used for any given data transport stream.

A session key register 152 provides session key pairs for each of the activated channels. These descrambling key pairs are loaded into register 152 by way of the VPB bus. Register 152, in turn, supplies the descrambling key to each of the decoders 141–148 and it is used by the decoders which are selected by the control signal in the descramble format register 150. The descrambled data stream appearing at the output of the selected one of decoders 141–148 is supplied to an output data register 153 to provide a clear or unscrambled output signal TSclear or TSc.

Figure 13:
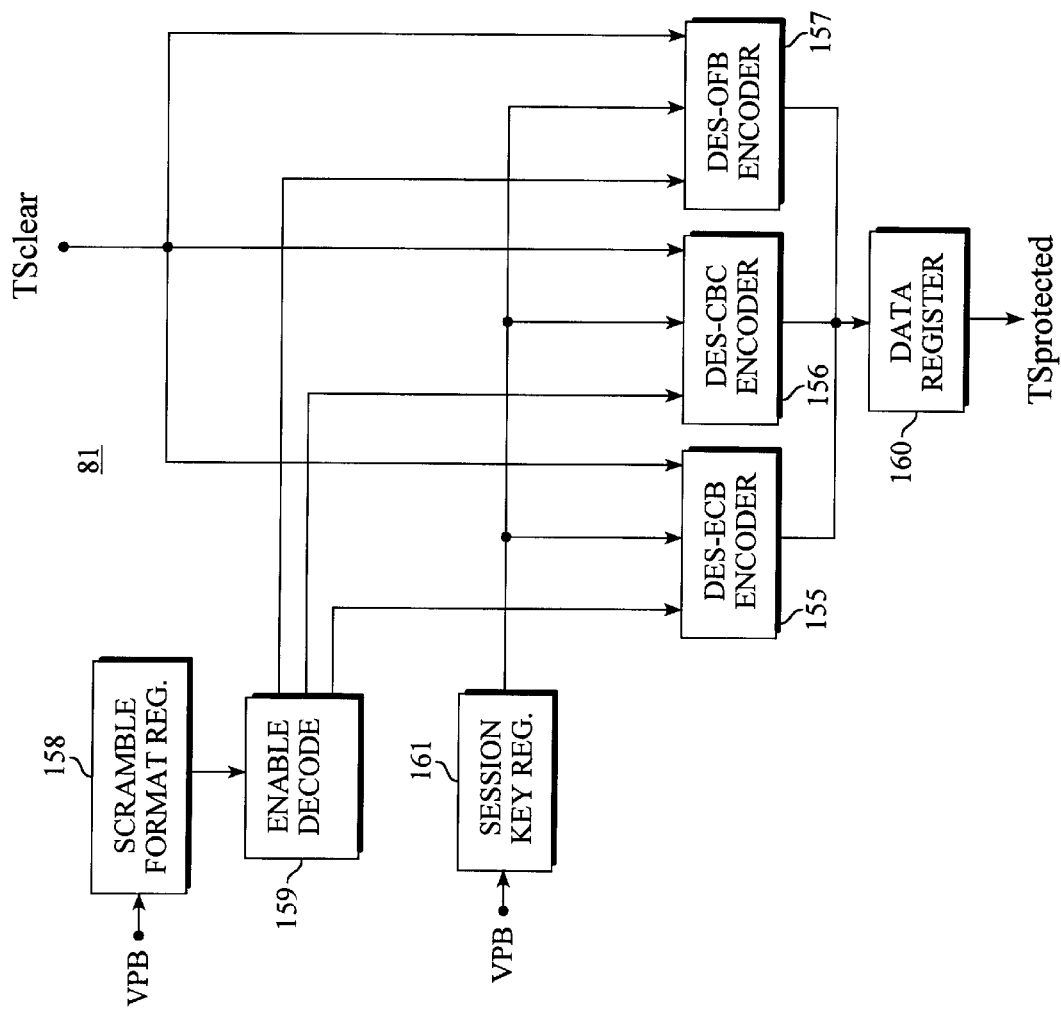
FIG. 13 shows the details of a representative form of construction for the copy protect scrambler of FIG. 11.

Referring now to FIG. 13, there is shown the details of a representative form of construction for the copy protection scrambler 81 of FIG. 11. For the embodiment shown in FIG. 13, the descrambler 81 includes a set of three encoders 155, 156 and 157 for encoding the TSclear signal from descrambler 80 in accordance with any one of the following three encryption formats: DES-ECB, DES-CBC and DES-OFB. Other scrambling formats may be used if desired. Selection of one or more of the encoders 155–157 is accomplished by means of a plural-bit 7 control signal which is loaded into a scramble format register 158. This control signal controls an enable signal decoder 159 to activate the select ones of its output lines, which output lines individually run to different ones of the encoders 155–157. The scrambled data stream appearing at the output of the selected encoder is supplied to an output data register 160 to provide the copy protected output signal TSprotected or TSp. The actual scrambling process, which is followed in the selected encoder, is controlled by a plural-bit scrambling session key which is loaded into a session key register 161. This scrambling session key is obtained from the microprocessor unit 42 by way of the VPB bus.

Figure 14:
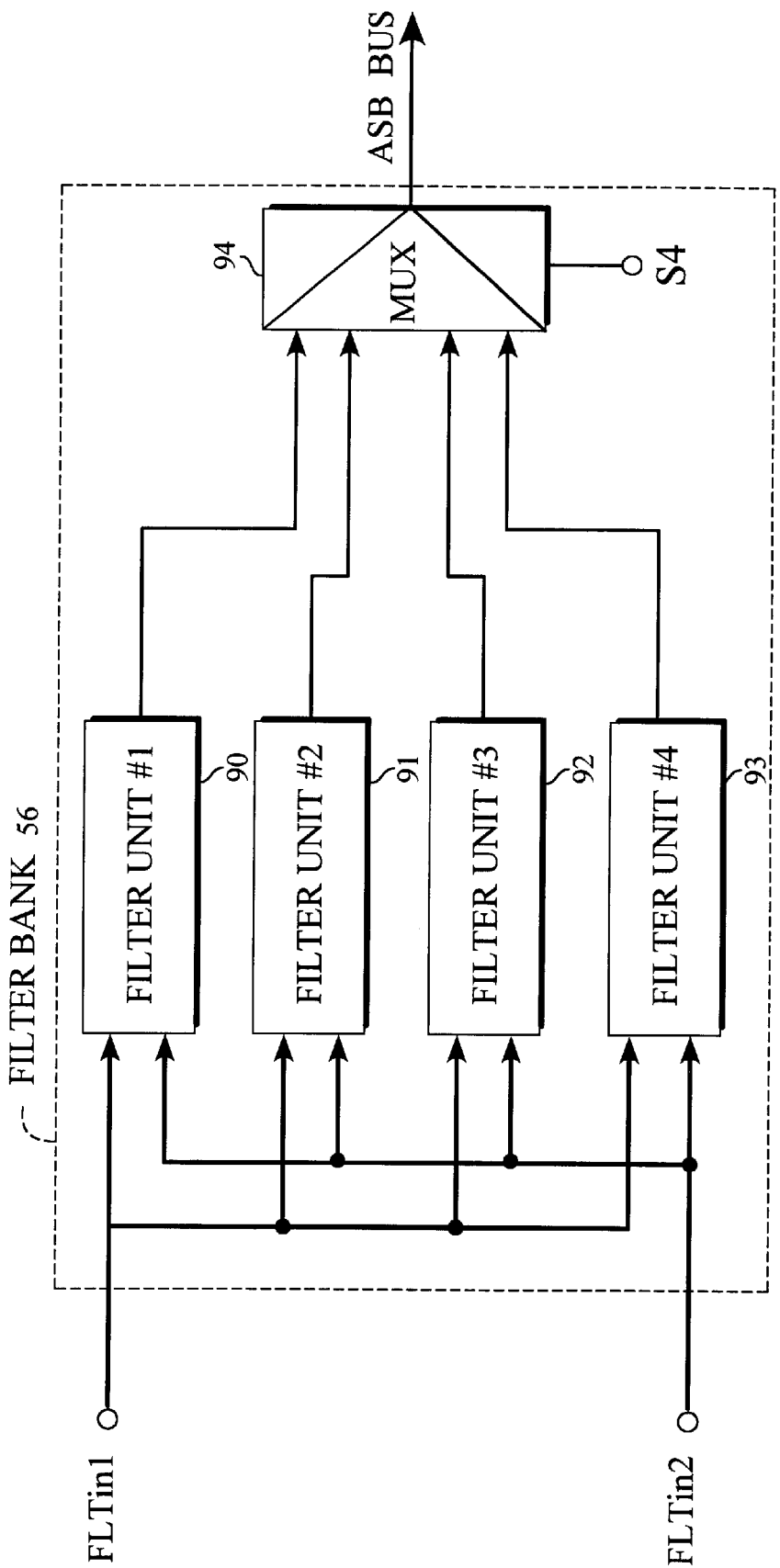
FIG. 14 shows a representative form of construction for the filter bank unit of FIG. 5.

Referring now to FIG. 14, there is shown a representative form of construction for the filter bank 56 of FIG. 5. This filter bank 56 examines incoming data streams to search for specific sections of data bytes. When a specific section is identified, its following data payload is stored in a allocated location in memory 43. In this way, the incoming data may be filtered or sorted according to the application or use for which it is intended. More particularly, the filter bank 56 has two inputs FLTin1 and FLTin2, which may convey different transport stream formats. For example, the first input FLTin1 can be connected to the in-band channel output from in-band receiver 30 and its data stream is assumed to use the MPEG packet format. The second input FLTin2 can receive the data stream from the out-of-band receiver 31 and the data signals of this out-of-band channel are assumed to be of the asynchronous transfer mode (ATM) cell format.

The filter bank 56 includes four filter units 90–93, which can be independently set up to process a different data streams. This architecture allows a flexible adjustment of the filtering resource depending on the type of application. For example, if the conditional access module is set up to support broadcast ATSC-type advanced television services (for example, high-definition television), the four filter units 90–93 are tuned to the in-band channel. For an interactive cable type of operation, on the other hand, up to three of the filter units can be set to process the out-of-band channel for collecting Internet and proprietary messages, while the fourth filter unit must stay tuned to the in-band channel for processing in-band command signals. The outputs of filter units 90–93 are selectively connected to the microprocessor ASB bus by a multiplexer 94 which is controlled by switching signal S4.

Figure 15:
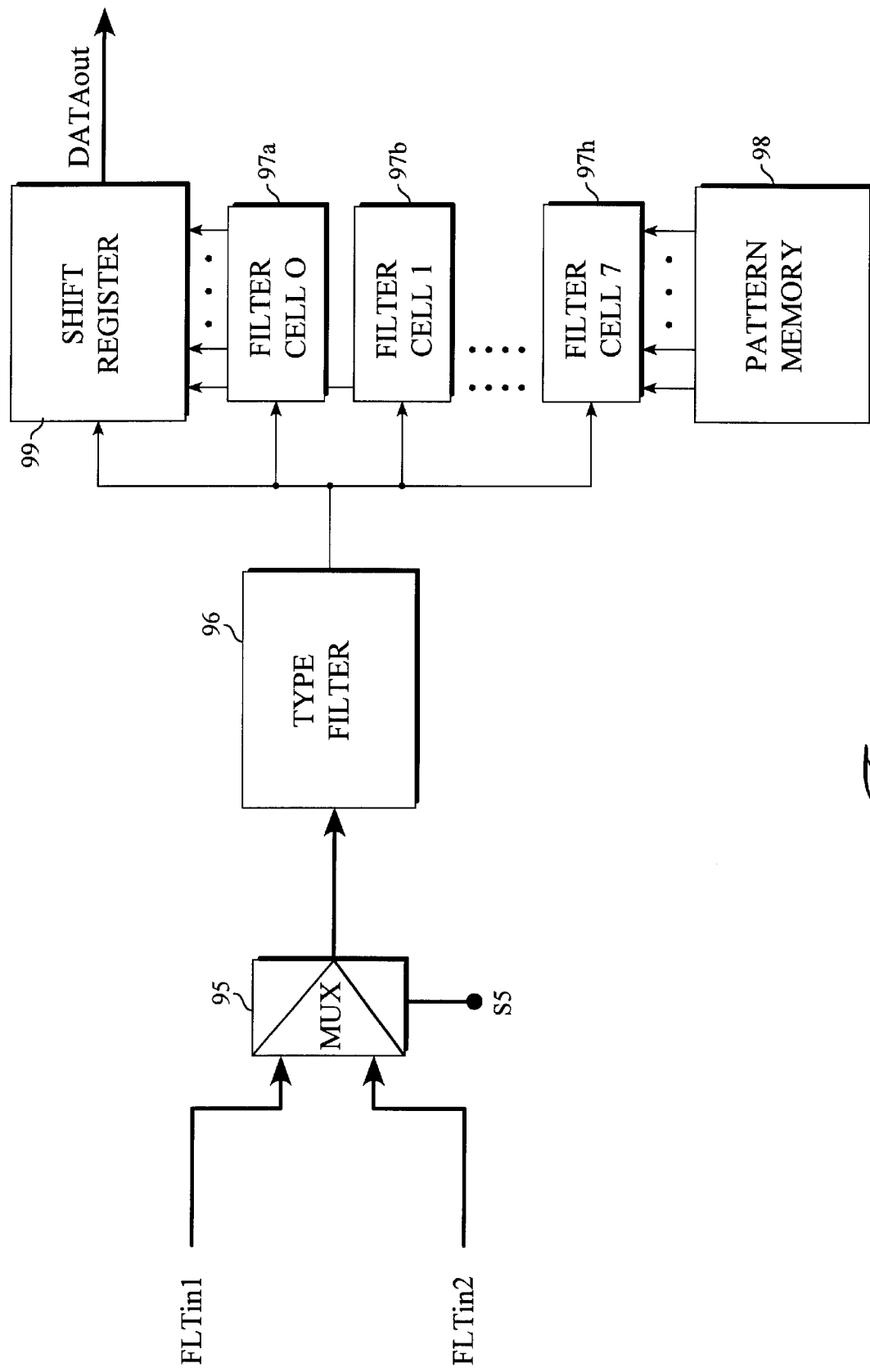
FIG. 15 shows in greater detail the construction of one of the filter units of FIG. 14.

FIG. 15 shows in greater detail a representative form of construction for one of the filter units 90–93 of FIG. 14. Each of the filter units 90–93 is of this same construction. The filter unit of FIG. 15 is tuned to one of the two inputs FLTin1 and FLTin2 by a multiplexer 95 which is set to select one of the two inputs by a selector signal S5. The selected input data stream is supplied to a Type Filter 96 which pre-filters the data bytes according to the plural-bit tags attached to them in the TS input unit 52 of FIG. 9. The pre-filtered bytes are then passed to an array of filter cells 97a–97h. Pre-recorded section of data bytes, which it is desired to detect are stored in a pattern memory 98 and are supplied to filter cells 97a–97h. For increasing the section of data bytes to be matched by each filter cell, it is possible to deactivate some of them and redistribute their section to the active filter cells. This architecture allows a flexible adjustment of the filtering depth depending on the type of application. When a pattern match occurs, the corresponding filter cell loads a shift register 99. Complete messages are extracted from shift register 99 for storage in the memory unit 43 associated with the CAM microprocessor unit 42.

FIG. 16 is a plan view of one form of PCMCIA smart card reader that may be used with the present invention. FIG. 16A is a left-end view, FIG. 16B is a right-end view and FIG. 16C is a side view of the card reader shown in FIG. 16. The acronym PCMCIA stands for Personal Computer Memory Card International Association. This is a non-profit trade association formed in 1989 to define a standard memory card interface. The smart card reader of FIG. 16 includes a metallic casing 100 which is adapted to receive a smart card of the size of a plastic credit card. The casing 100 conforms to ISO Standard 7816. In use, the smart card is inserted into the casing 100 and the casing 100 is, in turn, inserted into an appropriate connector receptacle in the set-top-box 16.

Figure 17:
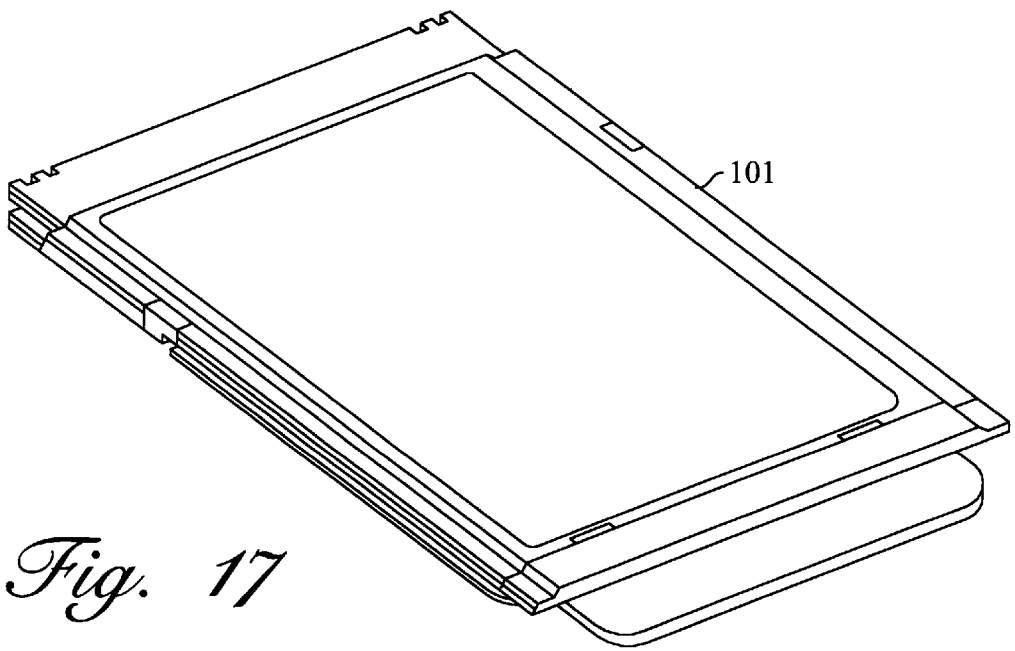
FIG. 17 is a perspective view of another form of PCMCIA card reader that may be used with the present invention.
Figure 18:
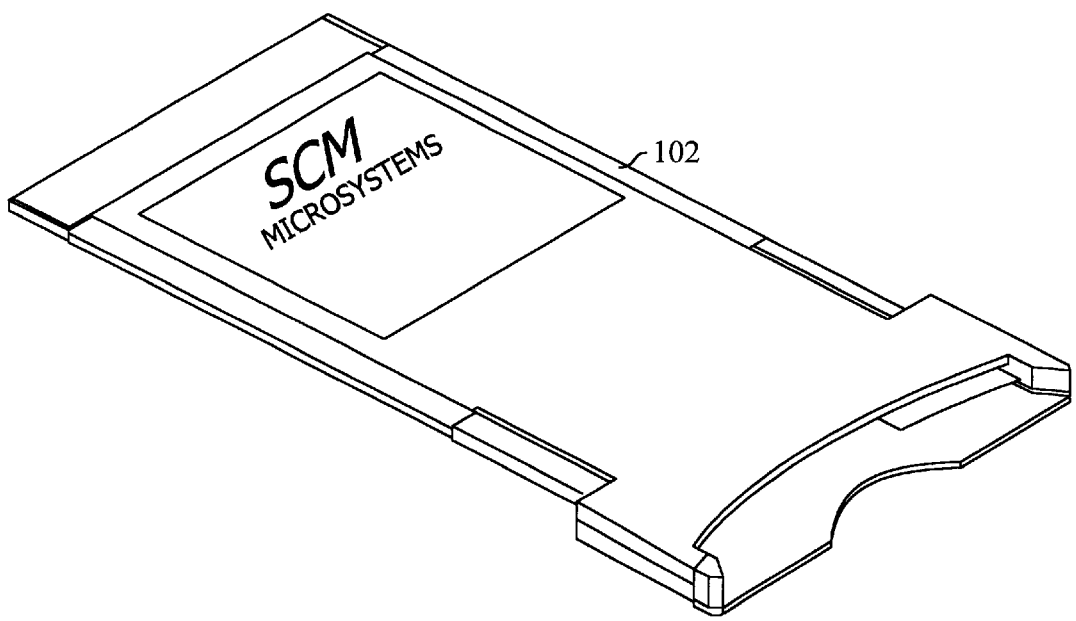
FIG. 18 shows a further form of card reader that may be used.

FIG. 17 is a perspective view of another form of PCMCIA card reader that may be used with the present invention. The reader casing 101 of FIG. 17 has a shorter extension, hence, a shorter overall length. FIG. 18 shows a further form of card reader that may be used. The reader casing 102 of FIG. 18 is a so-called dual reader casing and is adapted to receive two different smart cards.

FIGS. 19, 20 and 21 show the packet formats for different types of data transport streams that may be handled by the present invention. FIG. 19 shows the format for an MPEG data stream packet. FIG. 20 shows the format for a DSS data stream packet and FIG. 21 shows the format for an ATM data stream cell. The MPEG format is the data transmission format developed by the Motion Picture Expert Group. The preferred form of MPEG is MPEG-2, which is defined in ISO/IEC Standard 13818. The acronym "DSS" stands for Digital Satellite Systems and refers to a format developed for use in transmitting digital signals by some satellite operators. The acronym "ATM" stands for Asynchronous Transfer Mode. It is a digital network protocol for efficient transport of both constant rate and bursty information in broadband digital networks. The ATM digital stream consists of fixed-length packets called "cells". Each cell contains 53 bytes and is comprised of a 5-byte header and a 48-byte information payload. The digital television signal standard approved for use in the United States employs the MPEG-2 transport stream format for packetizing and multiplexing the video, audio and data signals.

An MPEG packet has an overall length of 188 bytes and includes a 4-byte header field and a variable length adaptation field, which can vary in length from zero bytes to the complete remaining of the packet. The remainder of the packet is comprised of payload bytes. A DSS packet has an overall length of 130 bytes and includes a 3-byte header field and an optional variable length adaptation field. The remainder of the DSS packet is comprised of payload bytes.

Figure 22:
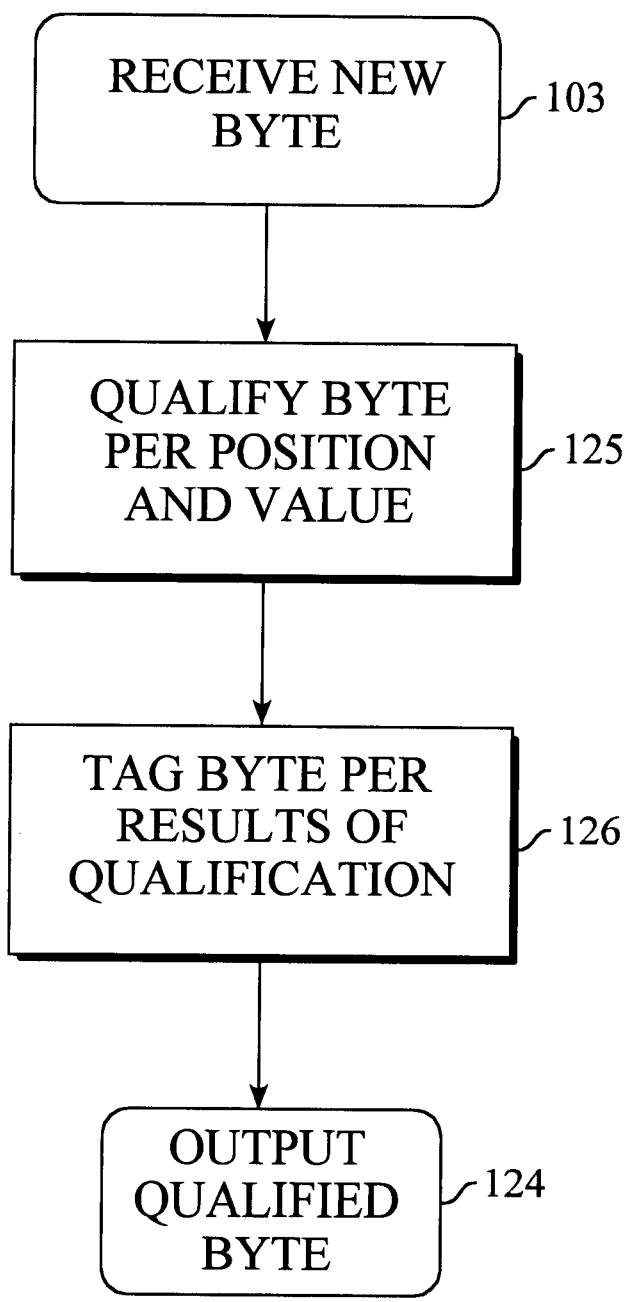
FIG. 22 is a flow chart used in explaining a multiple data transport feature of the present invention.

FIG. 22 is a flow chart, which explains the general nature of the multiple data transport feature of the present invention. Each newly received data byte (Block 103) is examined and qualified according to its position and value in its data packet (Block 125). The examined byte is then tagged with a plural-bit tag (Block 126), the value of the tag being determined by the results of the qualifying process (Block 125). The resulting tagged byte is then passed on as a qualified byte (Block 124). In the present embodiment, the process described by FIG. 22 is performed by the TS input unit 52 shown in FIG. 9. The qualification and tagging of the received data bytes is performed by the parsers 137 and 138.

Figure 23:
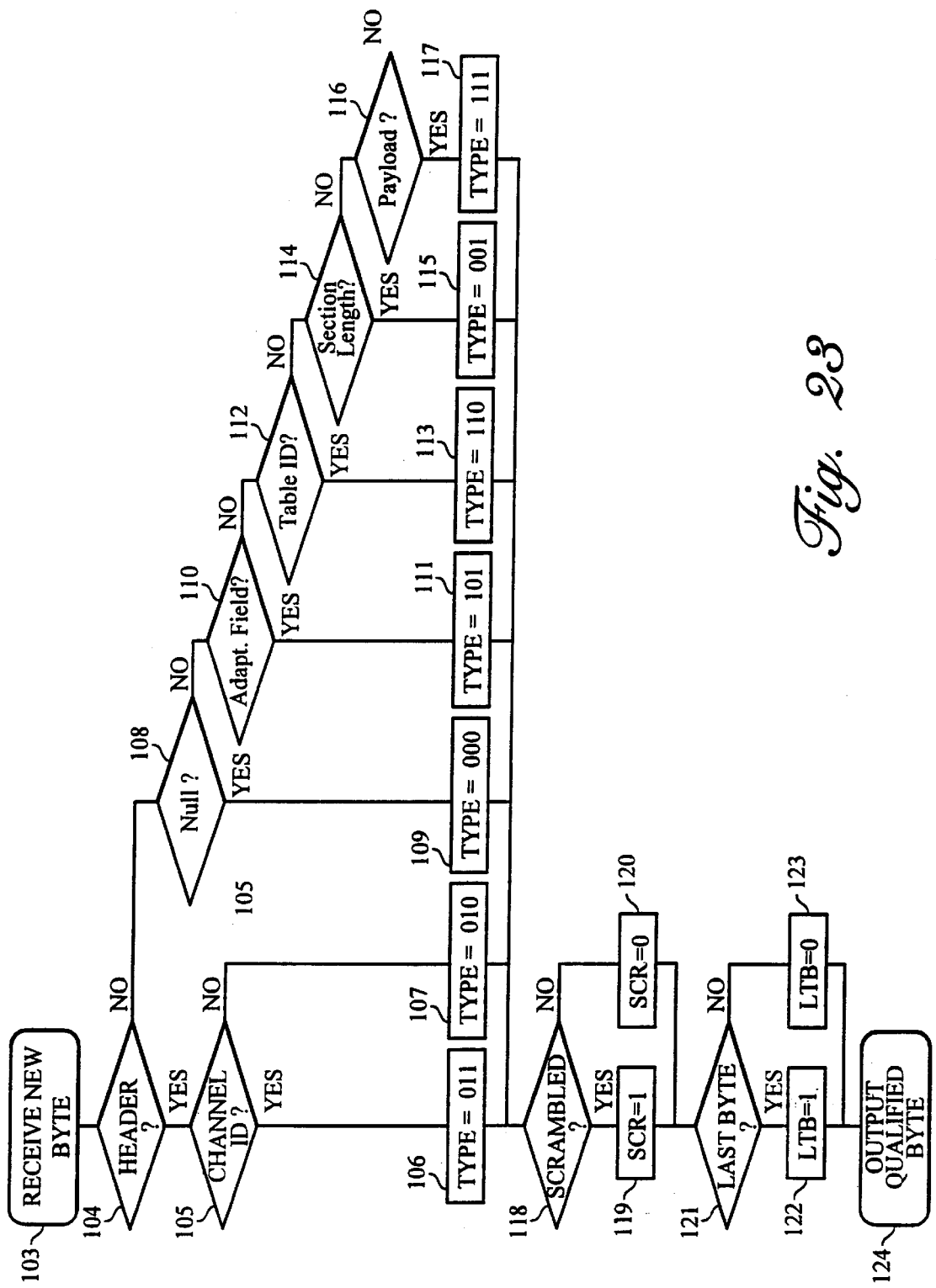
FIG. 23 is a detailed flow chart for a representative implementation of the method of FIG. 22.

Referring to FIG. 23, there is shown a detailed flow chart for a representative implementation of the method of FIG. 22. This multiple transport method of FIG. 23 enables the conditional access module 17 to handle any of the MPEG, ATM and DSS transport stream formats. Each incoming data byte is qualified according to its position and value within its packet. This qualification mechanism attaches a 5-bit tag to each data byte, which tag contains all the information required for further processing of the byte. The qualification of each new byte starts with Block 103 of FIG. 23, which block represents the reception of the new byte. The byte is first examined to determine if it is a header byte (Block 104). If it is, a determination is then made as to whether it contains channel identification (ID) data (Block 105). If the answer is yes, the byte is assigned a 3-bit tag portion having a value of "011" (Block 106). If it is not a channel ID, then the byte is assigned a 3-bit tag portion having a value of "010" (Block 107). Note that the total tag is a 5-bit tag. The purpose of the other two bits will be described shortly.

If the determination of Block 104 determines that the new byte is not a header byte, then the byte undergoes a series of further non-header byte tests. The first test, represented by Block 108, is to determine whether the byte is a null byte. If yes, it is assigned a 3-bit tag having a code of "000", as indicated by Block 109. If the answer is no, then the byte proceeds to an adaptation field test represented by Block 110. If the byte is an adaptation field byte, then it is assigned a tag value of "101", as represented by Block 111. If it is not an adaptation field byte, then the test of Block 112 is performed to determine whether or not it is a table identification (TID) byte. If yes, the byte is assigned a 3-bit tag having a value of "110", as represented by Block 113. If no, the byte is examined per Block 114 to determined whether it is a section length indicator byte. If yes, it is assigned a 3-bit tag value of "001", as indicated at Block 115. If no, the byte proceeds to the payload decision Block 116. Since this is the only alternative left, the byte is determined to be a payload byte and is given a 3-bit tag portion having a value of "111", as indicated at Block 117.

After assignment of the initial 3-bit portion of its tag, the newly received byte is tested as indicated by decision Block 118, to determine whether its data is scrambled or clear. If scrambled, a fourth bit in the tag, namely, the SCR bit is set to 1. If not scrambled, the SCR bit is set to 0. The byte is then tested as indicated by Block 121 to determine whether it is the last byte of packet or a cell. If it is a last byte, the LTB bit (the fifth bit in the 5-bit tag) is set to 1 (Block 122) and if not, the LTB bit is set to 0 (Block 123). This completes the qualification process and the qualified output byte at step 124 is now in condition for further processing in the conditional access module 17.

The qualification process of FIG. 23 produces a stream of output bytes, which are no longer dependent on the particular transport stream format, which brought them to the same conditional access module 17. Thus, the conditional access module 17 is enabled to process a variety of different transport stream formats in an efficient manner with minimal complication. And while the described implementation supports the MPEG, DSS and ATM transport stream formats, it can be readily extended to handle other packet-type or cell-type transport structures.

Figure 24:
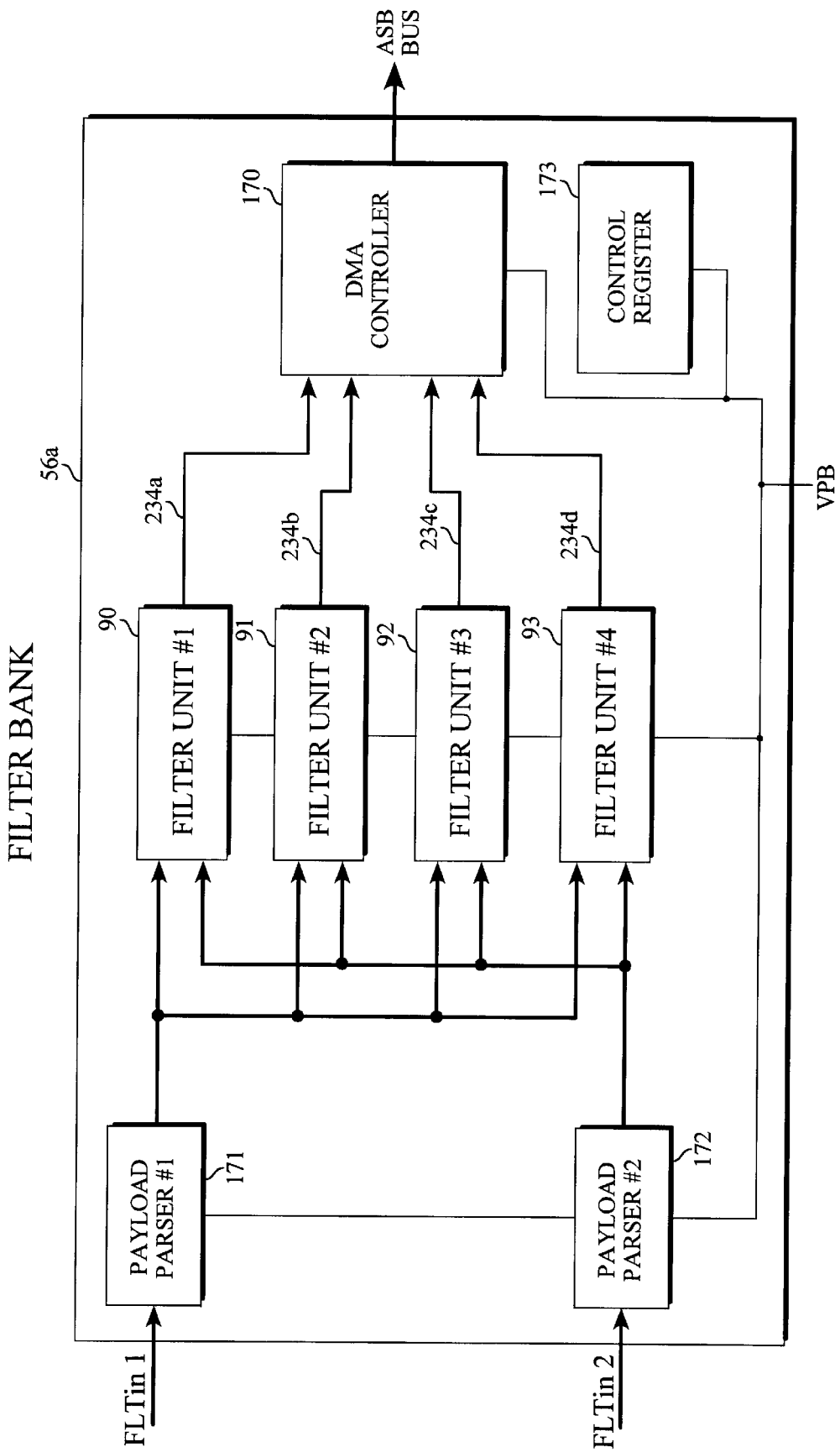
FIG. 24 shows a modified version of the filter bank unit of FIG. 14.

Referring now to FIG. 24, there is shown a modified version of the filter bank unit 56 of FIG. 14. Filter units 90–93 are the same as before. The function provided by multiplexer 94 of FIG. 14 is included within a DMA controller 170 in FIG. 24. Individual payload parsers 171 and 172 are individually located in the incoming signal paths for the input signals FLTin1 and FLTin2. A control register 173 controls the operations of the various units shown in FIG. 24. This control register 173 is loaded with an appropriate control word by way of the VPB bus.

Filter bank 56a examines two different incoming data streams FLTin1 and FLTin2 for detecting different predefined sections. The different sections identify useful data for the different applications or end uses, which are provided in the receiving apparatus. When one or more incoming packet are detected, which include the required specific section, the following data payloads are extracted and transferred to an end use location in memory unit 43 (FIG. 4). In this way, the incoming data segments are filtered or sorted according to the application or use for which they are intended.

By way of example, it is assumed for an interactive cable network that the first data stream input FLTin1 is connected to the in-band channel output from in-band receiver 30 and it is assumed that its data stream uses the MPEG packet format. The second input FLTin2 is assumed to be receiving the data stream from the out-of-band receiver 31 and the data signals of this out-of-band channel are assumed to be of the asynchronous transfer mode (ATM) cell format. The four filter units 90–93, which are of identical internal construction, are initially set up to process different data streams. This architecture allows a flexible adjustment of the filtering resource depending on the type of application. The outputs of filter units 90–93 are selectively connected to the microprocessor ASB bus by a multiplexer which is located within the DMA controller 170.

Figure 25:
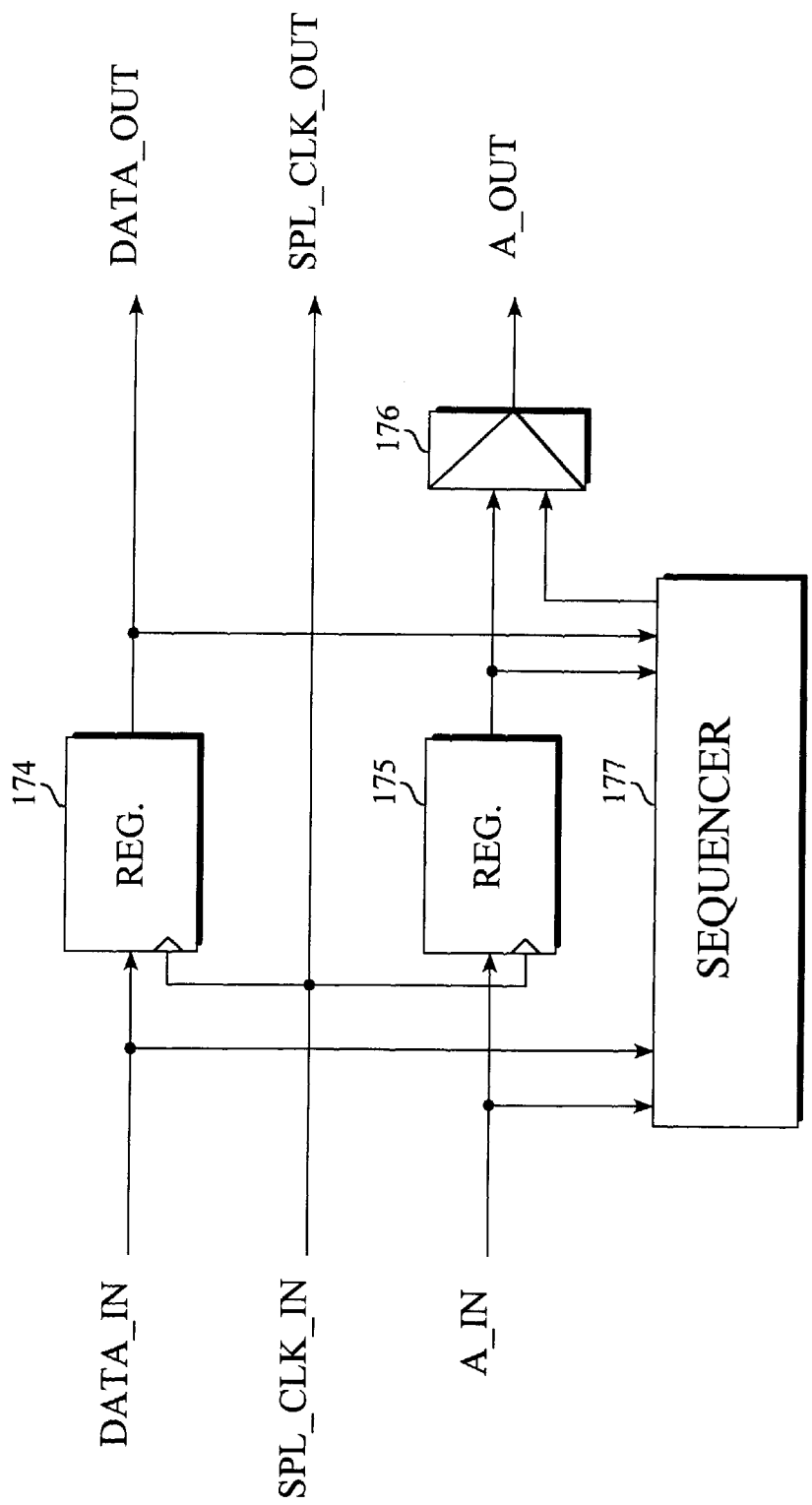
FIG. 25 is a more detailed block diagram for each payload parser of FIG. 24.

Each of the payload parsers 171 and 172 are of the same internal construction. This internal construction is shown in greater detail in FIG. 25. The payload parser shown in FIG. 25 includes a pair of registers 174 and 175, a signal multiplexer 176 and a sequencer 177. The DATA-IN bus is connected to the appropriate one of the FLTin1 and FLTin2 inputs and the DATA-OUT bus is connected to the appropriate ones of filter units 90–93. The payload parser of FIG. 25 is responsible for post scrambling identification of the payload. It is responsible for finding the table ID bytes and switching their byte types from payload type to table ID type. As such, the payload parser allows processing of scrambled private MPEG PSI tables.

Figure 26:
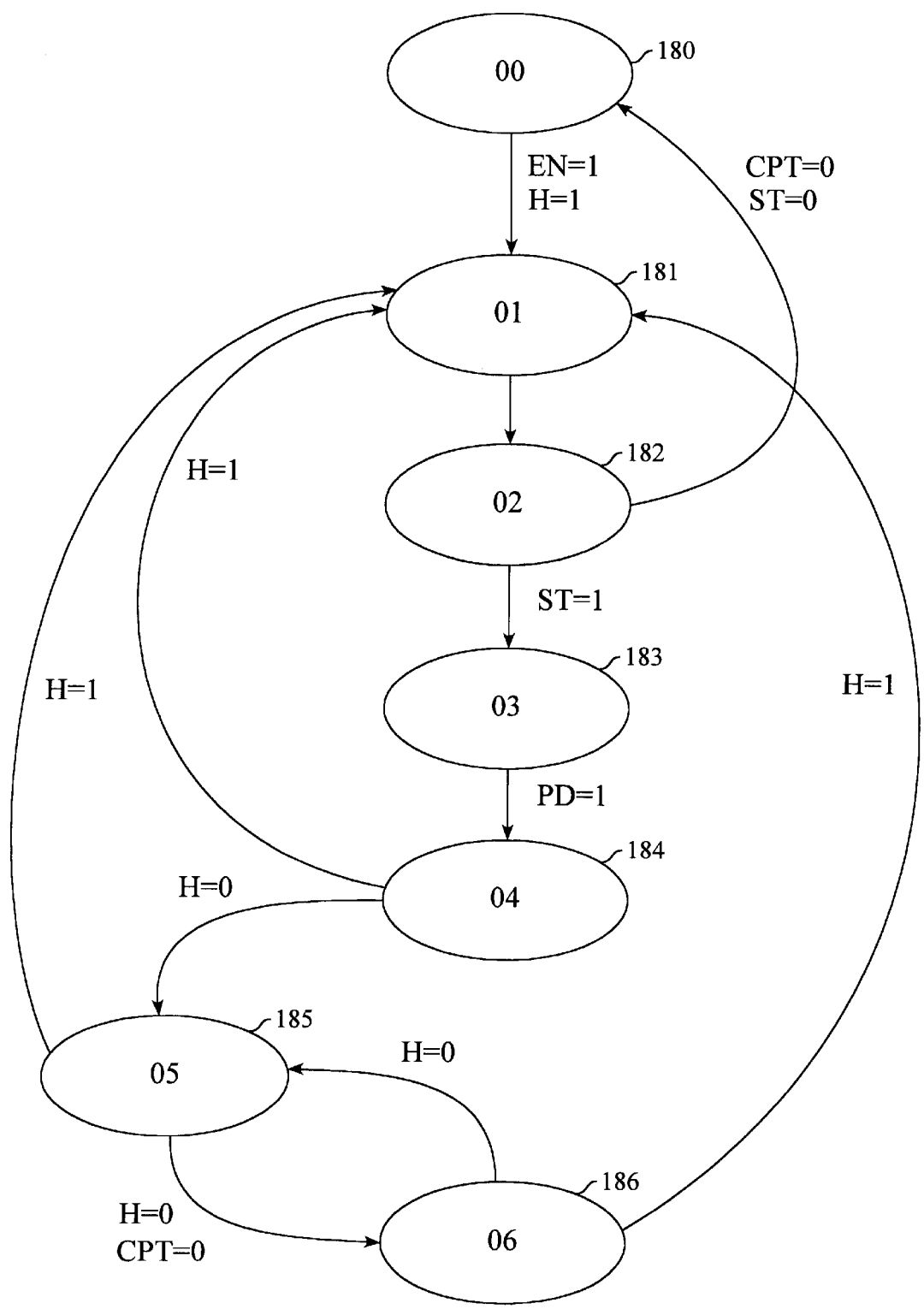
FIG. 26 is a state diagram of operation for the payload parser of FIG. 25.

FIG. 26 shows a state diagram for the payload parser sequencer 177. State 0 (Block 180) represents the idle mode. State 1 (Block 181) is a header start mode and occurs when a header type byte H is received, as indicated by tag bits supplied by way of the A-IN bus to the tag bit register 175. State 2 (Block 182) is a header count and compare mode. State 3 (Block 183) is a payload wait mode. State 4 (Block 184) is a payload start mode. State 5 (Block 185) is a payload count and compare mode. And State 6 (Block 186) is a length load mode.

Figure 27:
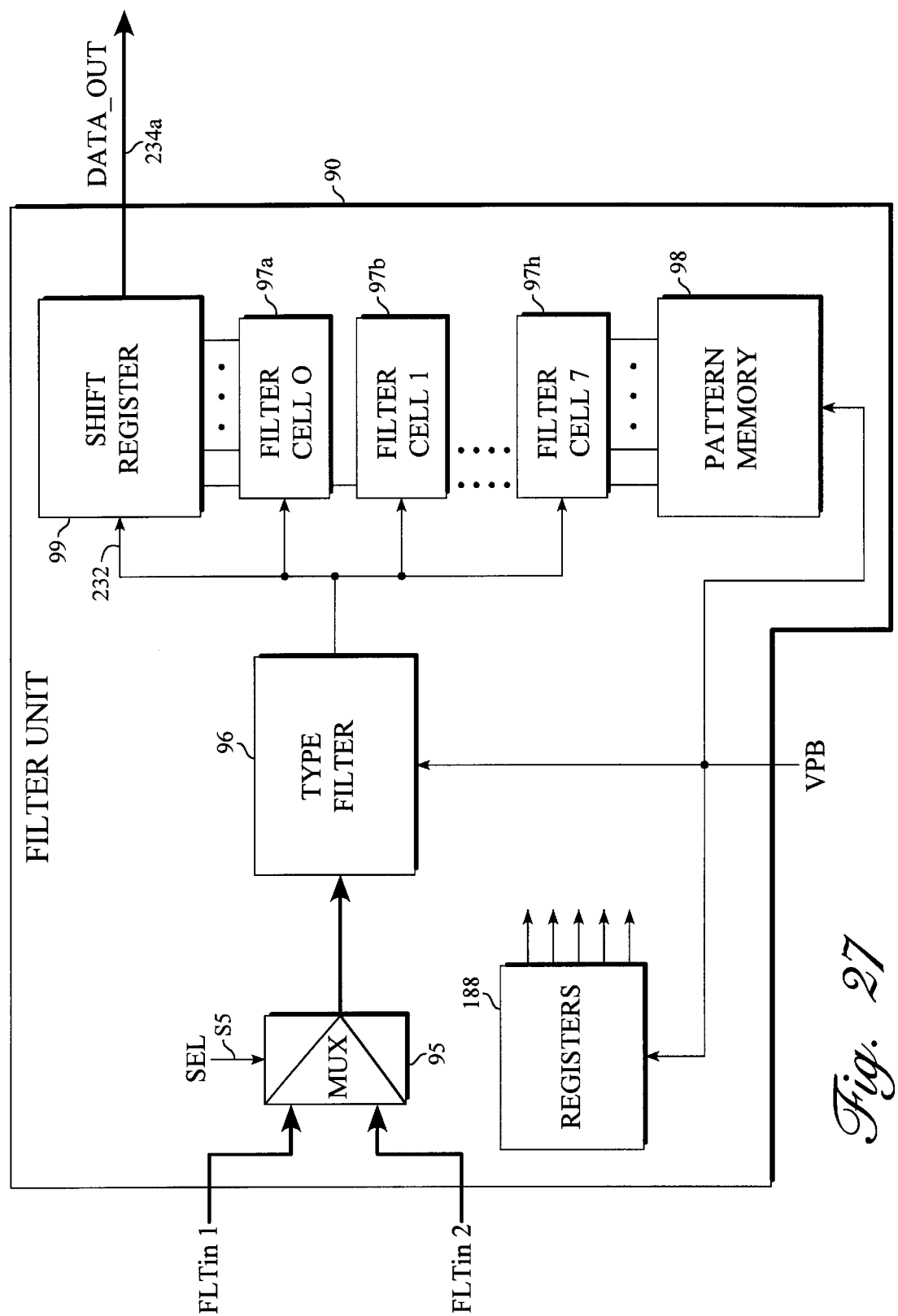
FIG. 27 is a block diagram of a modified version of the filter unit of FIG. 15.

Each of the filter units 90–93 of FIG. 24 are of the same internal construction. This internal construction is indicated in FIG. 27 for the case of filter 90. As previously indicated in FIG. 15, the filter unit in FIG. 27 includes a multiplexer 95, a type filter 96, a set of eight filter cells 97a–97h, pattern memory 98 and a shift register 99. As indicated in FIG. 27, a control register 188 provides appropriate controls signals for the other blocks in FIG. 27. Register 188 is loaded by way of the VPB peripheral bus.

Figure 28:
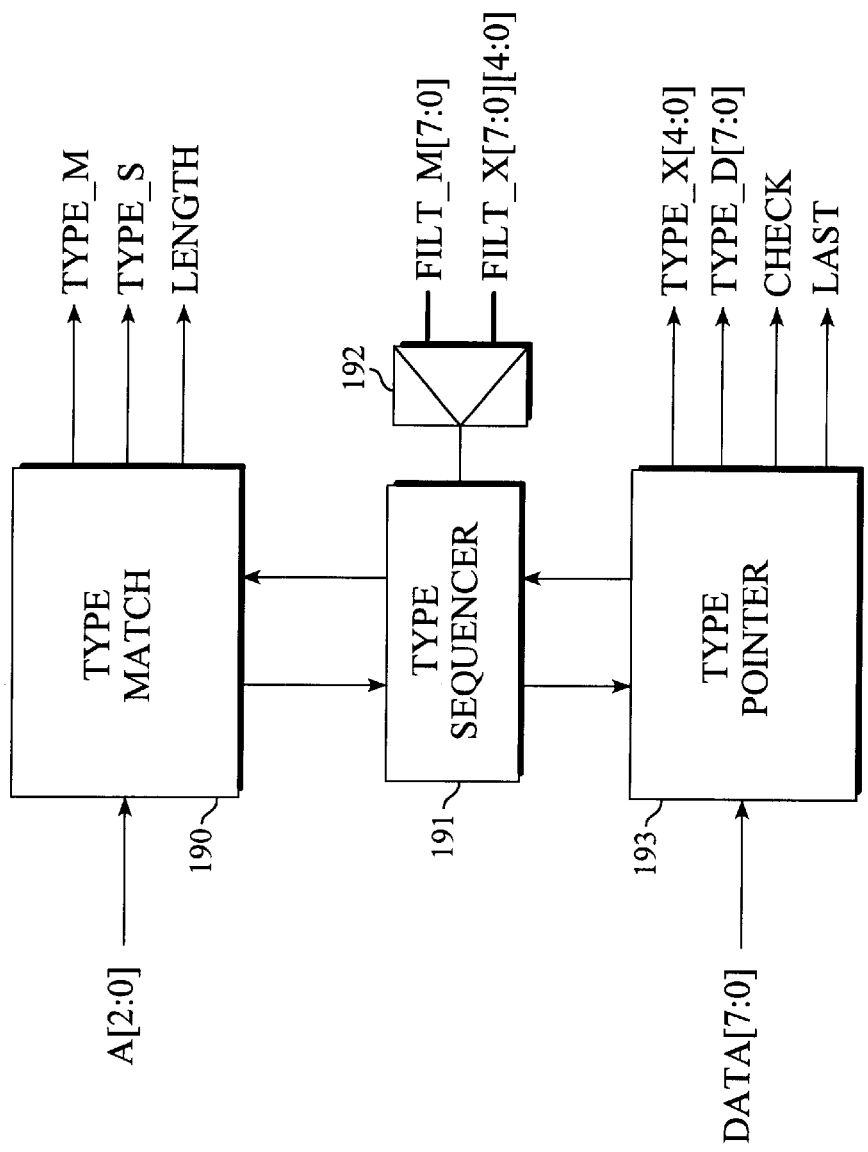
FIG. 28 shows in greater detail the construction of a representative embodiment for the type filter of FIG. 27.

Multiplexer 95 selects the input data stream to be processed by the filter unit of FIG. 27. Type filter 96 receives the selected data stream and pre-selects the data that has to be matched and extracted according to a particular pre-registered profile. The internal details for type filter 96 are indicated in FIG. 28. As there shown, type filter 96 includes a type match unit 190 which receives tag bits A, a type filter sequencer 191, a signal multiplexer 192 and a type pointer unit 193 which receives the selected incoming data signals, designated here as the DATA signals.

Figure 29:
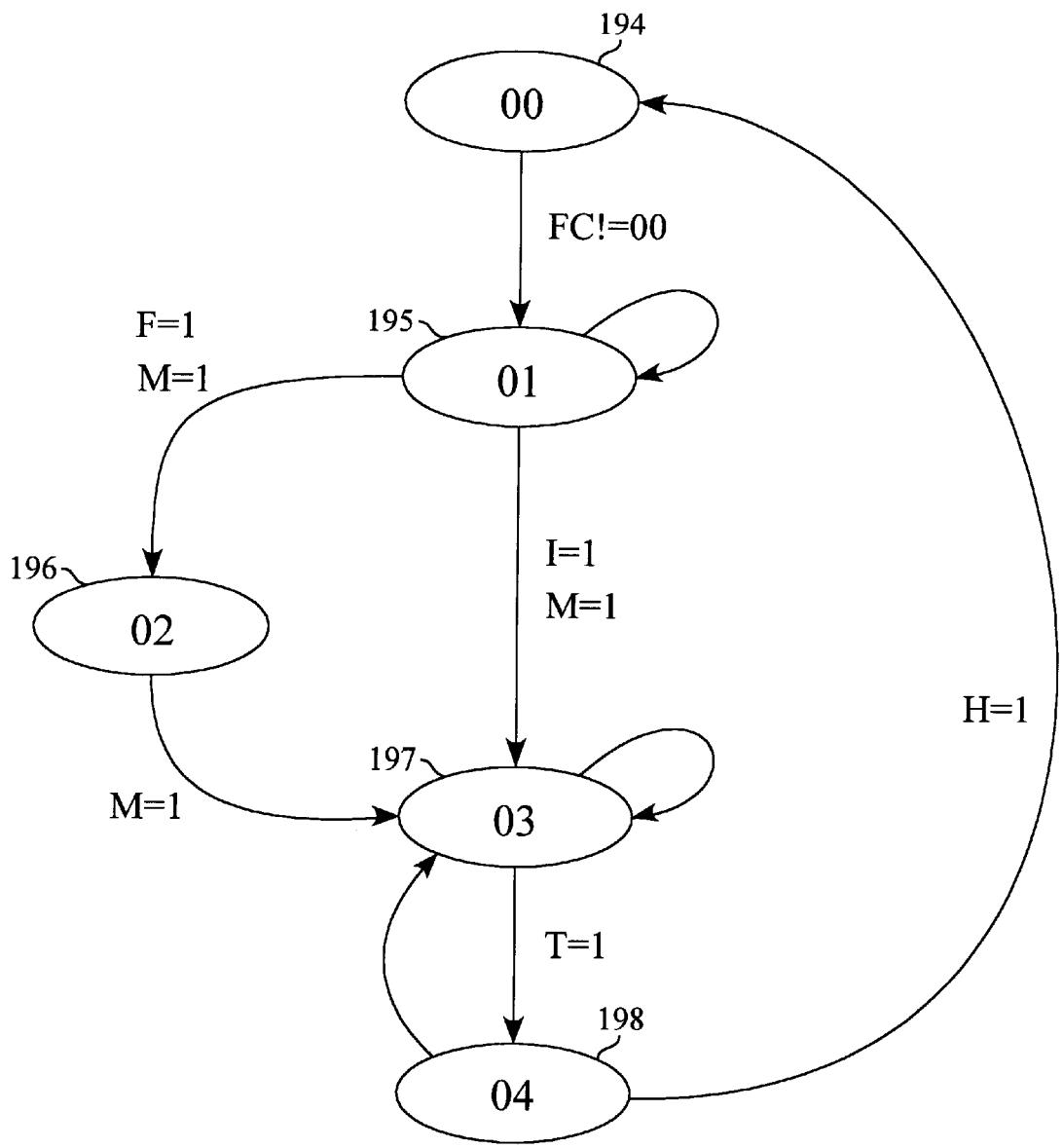
FIG. 29 is a state diagram of operation for the type filter sequencer of FIG. 28.

FIG. 29 shows a state diagram for the type filter sequencer 191 of FIG. 28. It has five different states 00–04 (Blocks 194–198, respectively). State 00 is an idle mode. State 01 is a header parsing mode. State 02 is a filter cell load mode. State 03 is a payload parsing mode. And State 04 is a header ID load mode.

Figure 30:
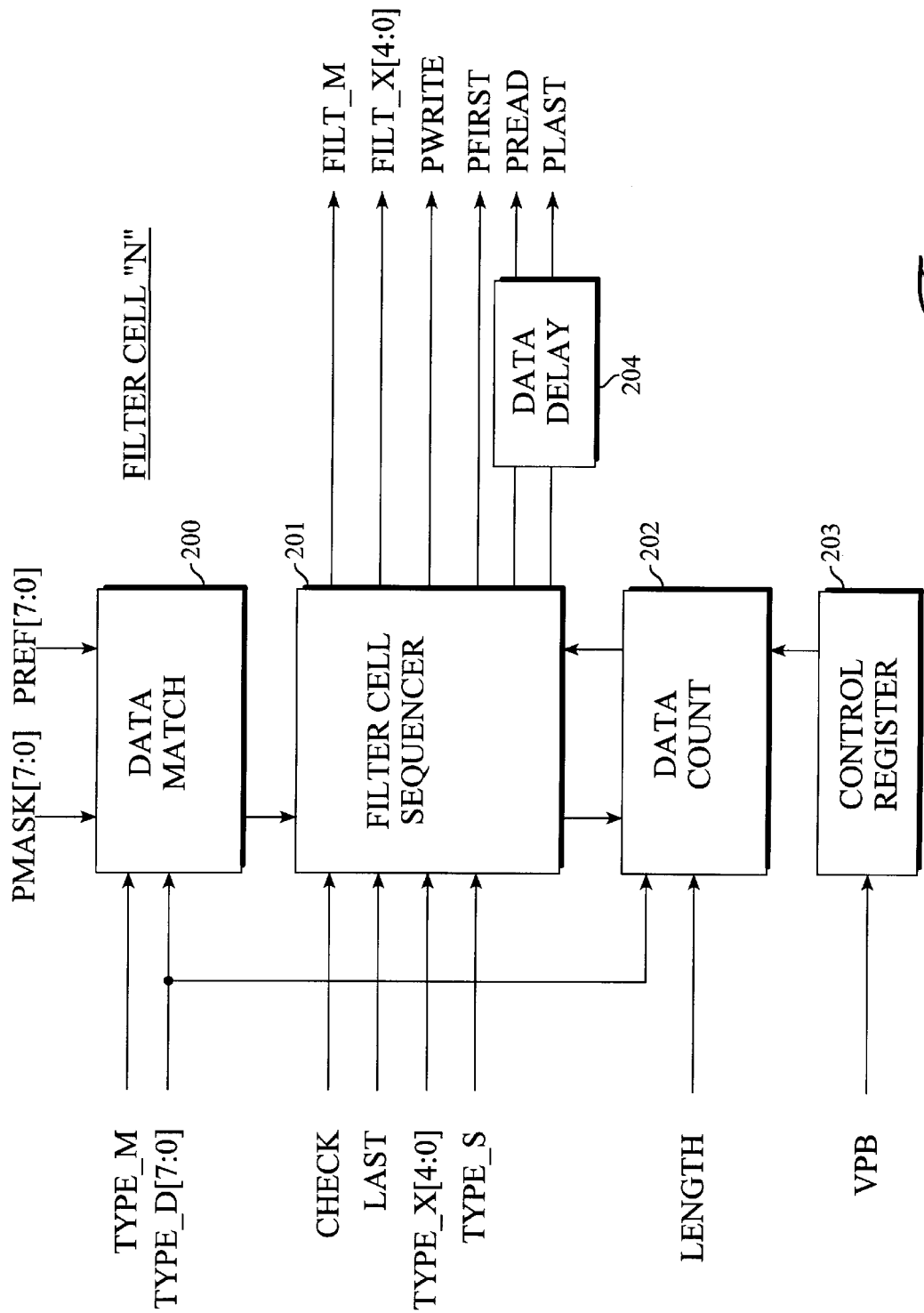
FIG. 30 shows in greater detail a representative form of construction for each of the filter cells of FIG. 27.

Each of filter cells 97a–97h of FIG. 27 are of the same internal construction. This internal construction is shown in FIG. 30 for a single one of the filter cells. As indicated in FIG. 30, each filter cell includes a data match unit 200, a filter cell sequencer 201, a data counter 202, a control register 203, and a data delay unit 204. Data from the type filter 96 arrives by way of the data bus TYPE-D. The digital signal patterns to be detected are supplied by way of the PREF and the PMASK buses. If a match occurs, the data match unit 200 supplies a match indication signal to the filter cell sequencer 201. Sequencer 201 thereupon activates the data extraction mechanism represented by shift register 99 to cause an extraction of the number of data bytes indicated by the LENGTH signal supplied to the data counter 202. Activation of the data extraction shift register 99 is controlled by the PWRITE signal from the filter cell sequencer 201.

Figure 31:
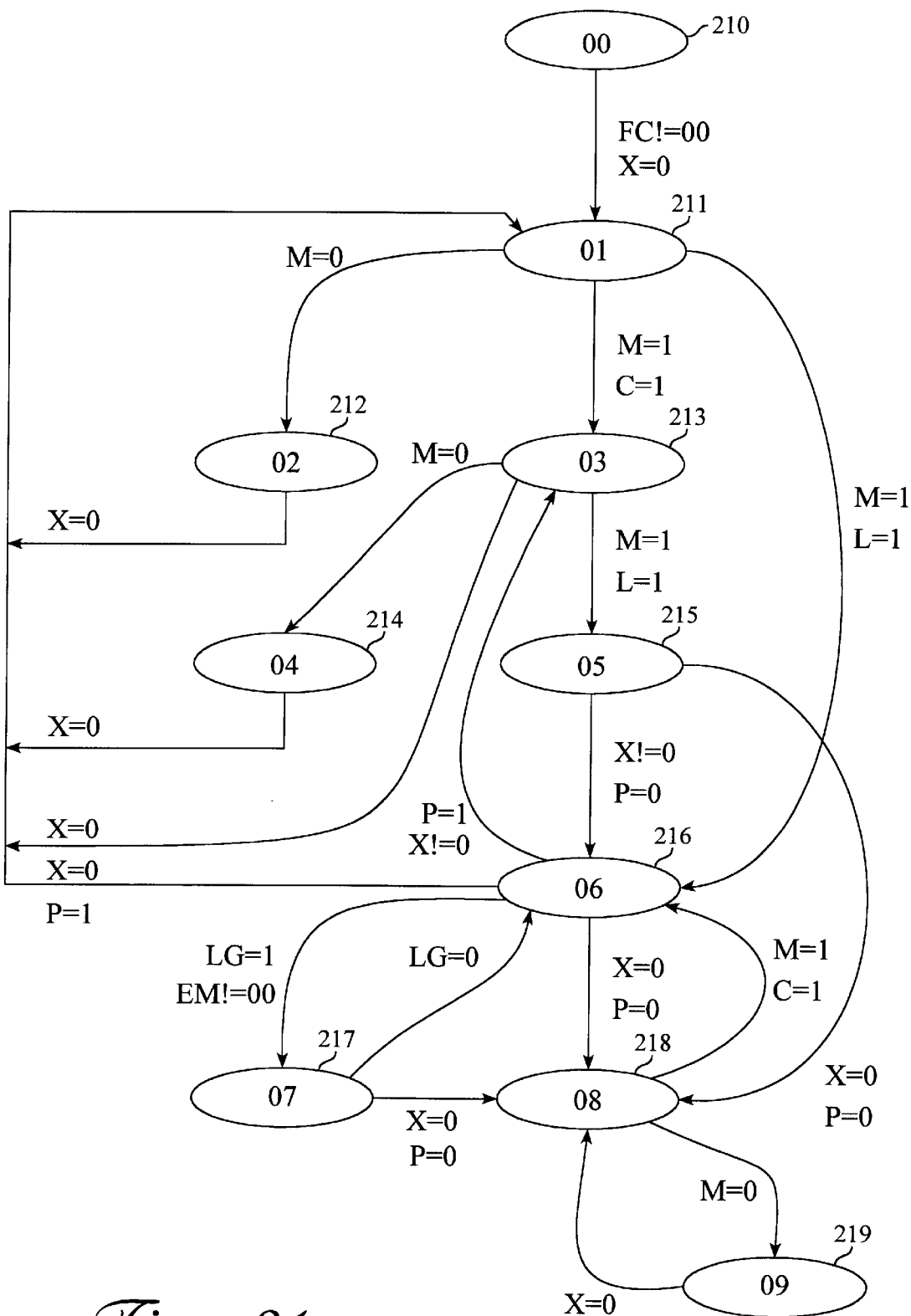
FIG. 31 is a state diagram of operation for the filter cell sequencer of FIG. 30.

FIG. 31 shows a state diagram for the filter cell sequencer 201 of FIG. 30. Sequencer 201 includes two active modes, namely, a match mode and an extract mode. During the match mode, the filter cell tries to match the packet header until it receives a CHECK signal. Then the filter cell will match the packet payload until it receives the LAST signal. In case a mismatch occurs, the sequencer 201 waits for the next packet to be matched. Otherwise, it starts the extract mode. The extract mode can last more than one packet.

As indicated in FIG. 31, the filter cell sequencer 201 has ten states 00–09 (Blocks 210–219, respectively). State 00 is an idle mode. States 01–04 are part of the match mode. And States 05–09 are part of the extract mode.

Figure 32:
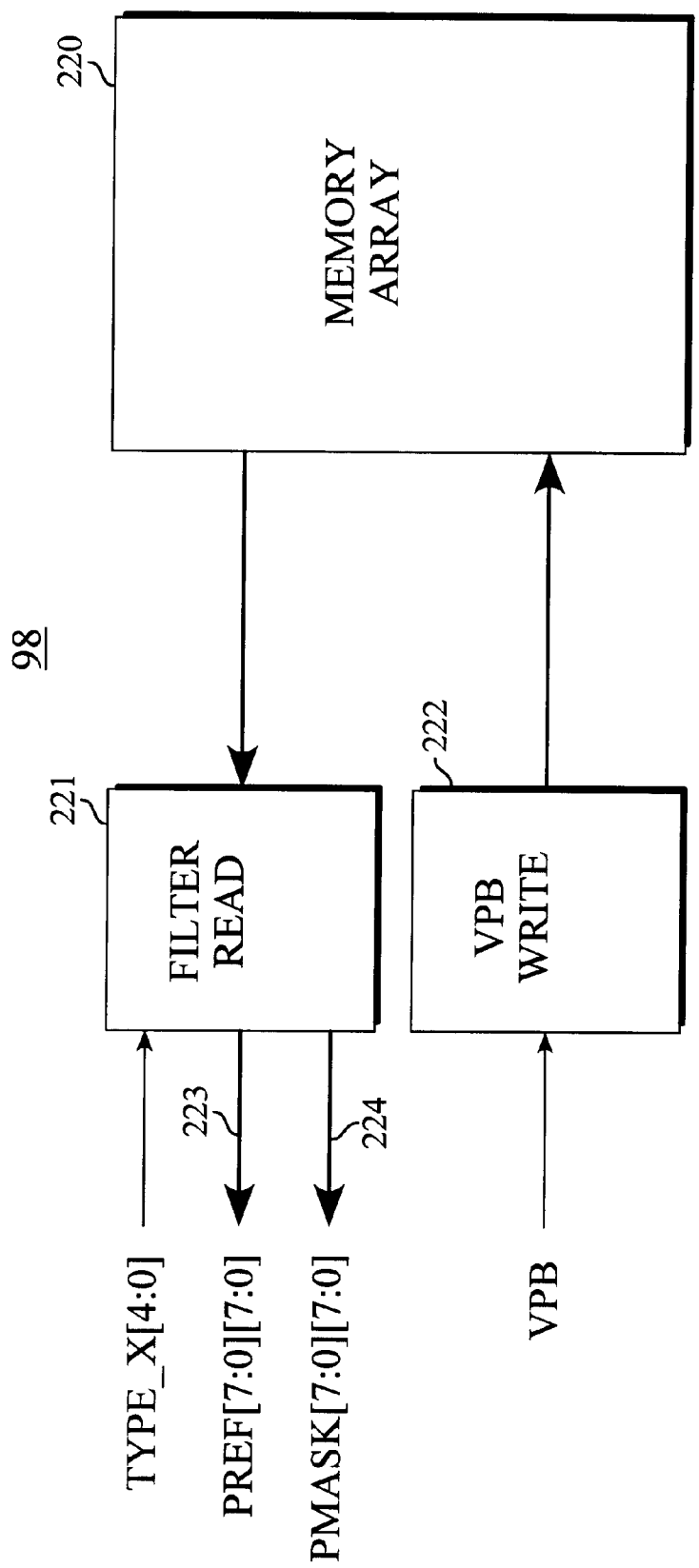
FIG. 32 is a more detailed block diagram for the pattern memory of FIG. 27.

FIG. 32 is a more detailed block diagram for the pattern memory unit 98 of FIG. 27. This pattern memory 98 includes a memory array 220, a filter read register 221 and a VPB write register 222. Memory array 220 contains the different digital signal patterns, which it is desired to match. Each digital signal pattern represents a different application program or end use for the incoming data signals. These signal patterns are stored into the memory array 220 by way of the VPB write register 222 and the VPB bus during the initial channel change set up operation of the system. The stored digital signal patterns in memory array 220 are supplied to the filter cells 97a–97h by way of the PREF and the PMASK buses 223 and 224.

Figure 33:
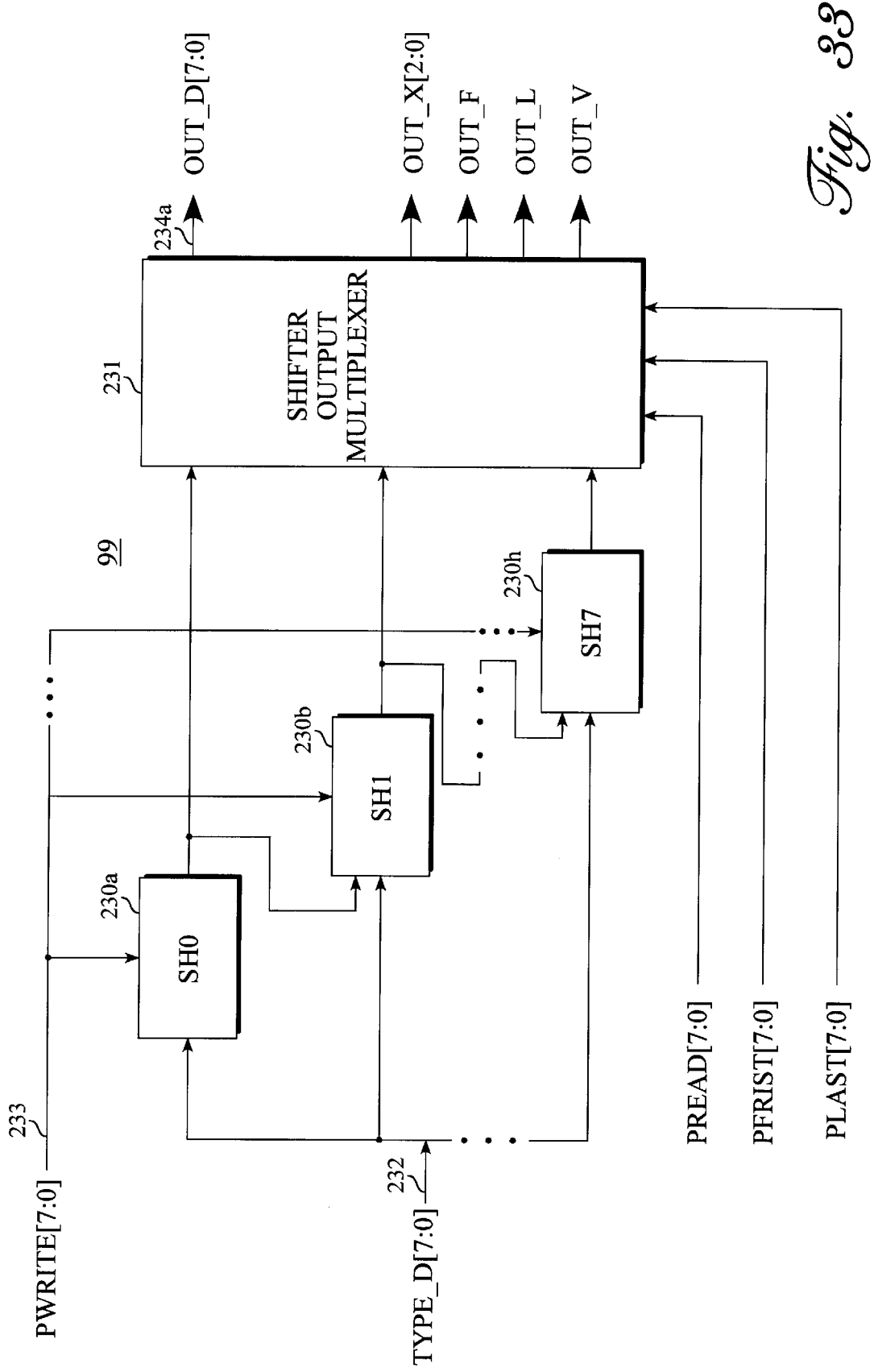
FIG. 33 is a block diagram of a shift register architecture for the filter unit of FIG. 27.

Referring now to FIG. 33, there is shown a block diagram of the shift register 99 for the filter unit of FIG. 27. As shown in FIG. 33, the shift register 99 includes a series of eight shift register stages SH0–SH7 (units 230a–230h) and a shifter output multiplexer 231. Register stages 230a–230h receive the output signals TYPE-D from the type filter 96 by way of data bus 232. When an extraction operation is initiated by the PWRITE signal on bus 233, the data bytes in stages 230a–230h are transferred by the shifter output multiplexer 231 in a time multiplexed manner to the output bus 234a. Output bus 234a runs to the DMA controller 170 of FIG. 24.

Figure 34:
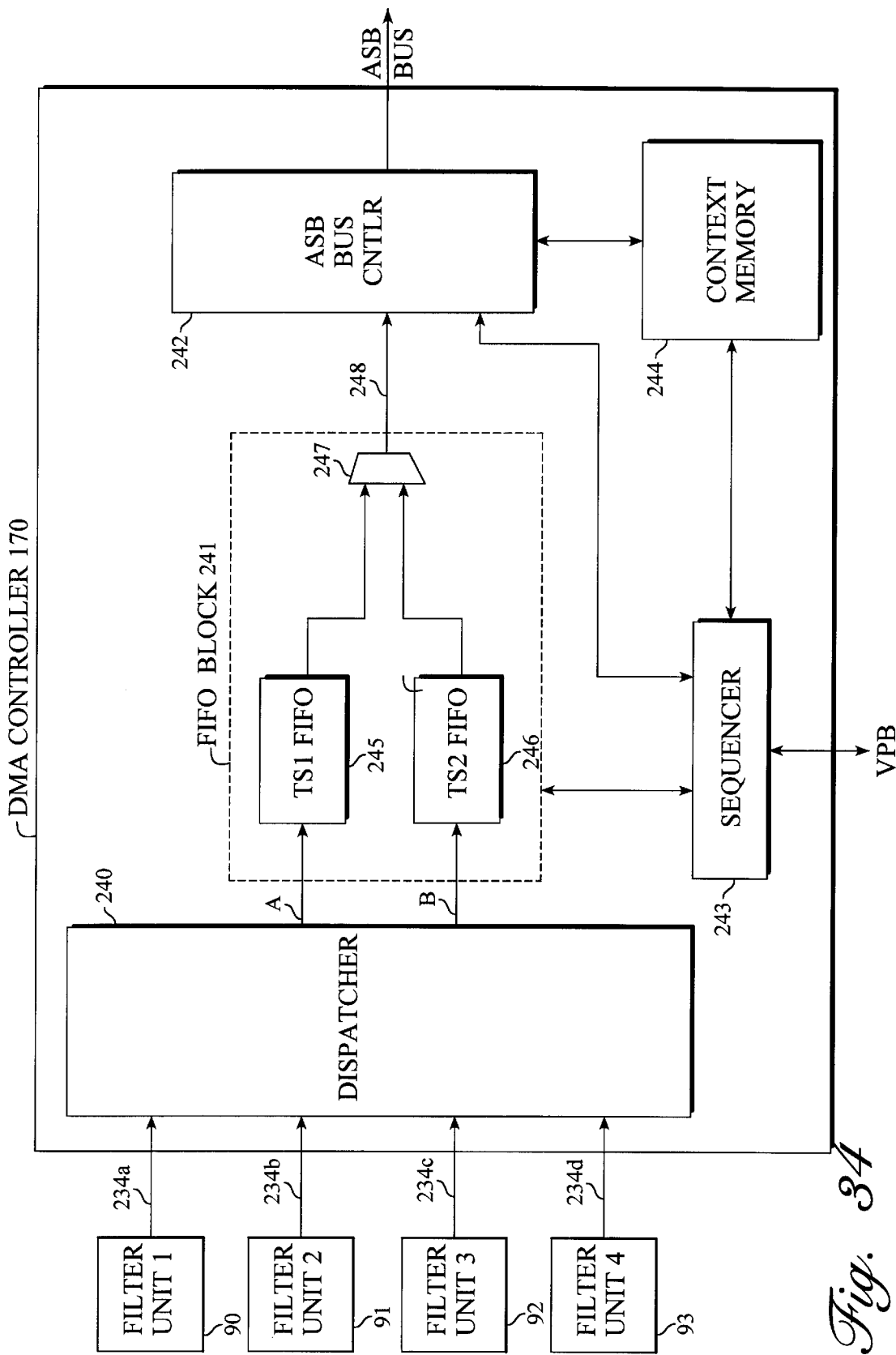
FIG. 34 is a more detailed block diagram for the DMA controller of FIG. 24.

Referring now to FIG. 34, there is shown a more detailed block diagram for the DMA controller 170 of FIG. 24. This controller 170 receives the output signals from the filter units 90–93 by way of their output buses 234a–234d, respectively. DMA controller 170 includes a dispatcher unit 240, a FIFO Block 241, an ASB bus controller 242, a DMA controller sequencer 243, and a context memory 244. FIFO Block 241 includes a pair of first-in-first-out memory units 245 and 246 and an output signal multiplexer 247 for time multiplexing the FIFO output signals supplied to the ASB bus controller 242 by way of FIFO output bus 248. The ASB bus runs to the CAM memory unit 43 (FIG. 4) by way of the memory interface unit 61 shown in FIG. 5.

Figure 35:
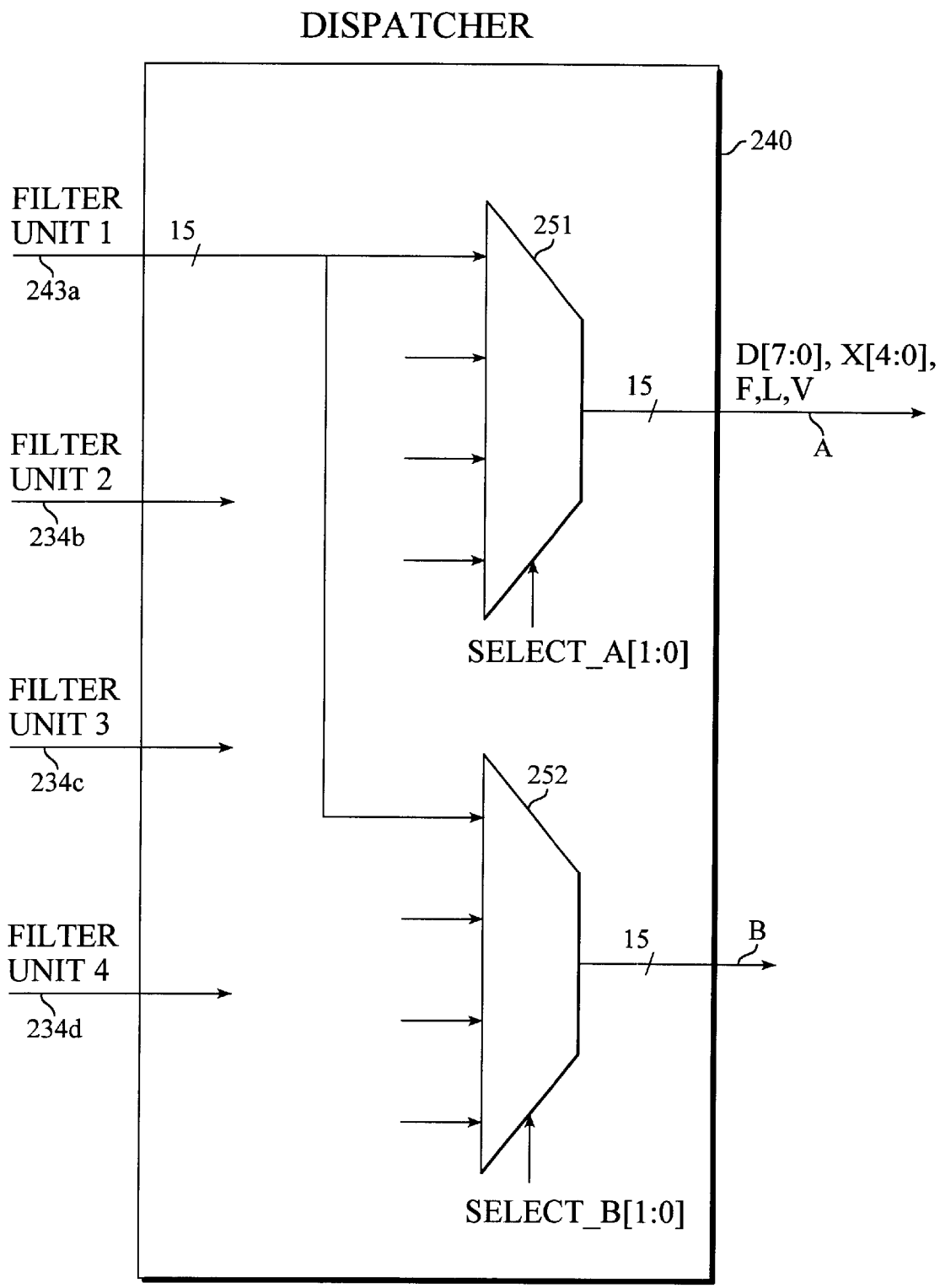
FIG. 35 is a block diagram showing representative details for the dispatcher unit of FIG. 34.

FIG. 35 is a block diagram showing representative details for the dispatcher unit 240 of FIG. 34. As shown in FIG. 35, dispatcher unit 240 includes a pair of multiplexer units 251 and 252 for connecting the appropriate filter units 90–93 to the appropriate output buses A and B of the dispatcher 240. This selection is determined by the initial channel change set up for the filter units 90–93. The filter units, which are set to receive the output of the first payload parser 171 (FIG. 24) are connected by way of multiplexer 251 to the dispatcher output bus A. The filter units which are set to receive the output signals from the second payload parser 172 (FIG. 24) are connected to the second multiplexer 252 to supply their output signals to the output bus B for the second multiplexer 252. As indicated in FIG. 34, bus A runs to FIFO unit 245 and bus B runs to FIFO unit 246.

Figure 36:
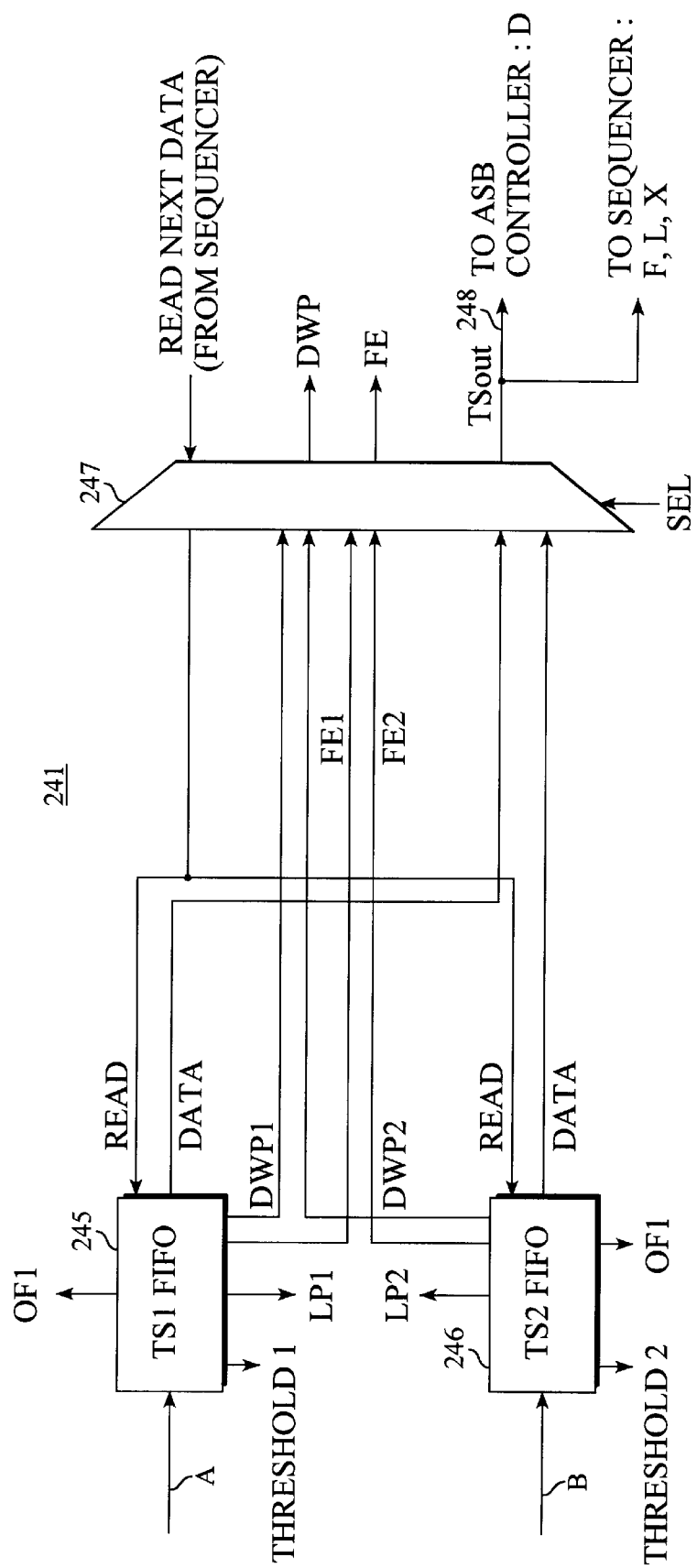
FIG. 36 shows in greater detail the construction of the FIFO block of FIG. 34.
Figure 37:
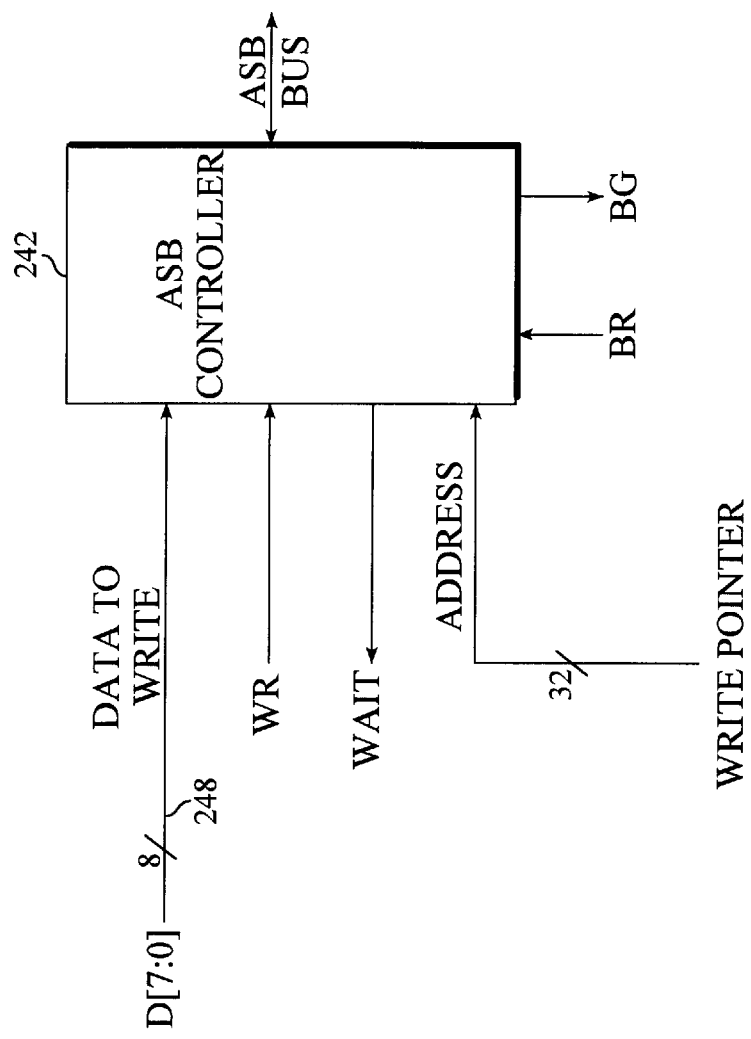
FIG. 37 is a block diagram for the ASB bus controller of FIG. 34.
Figure 38:
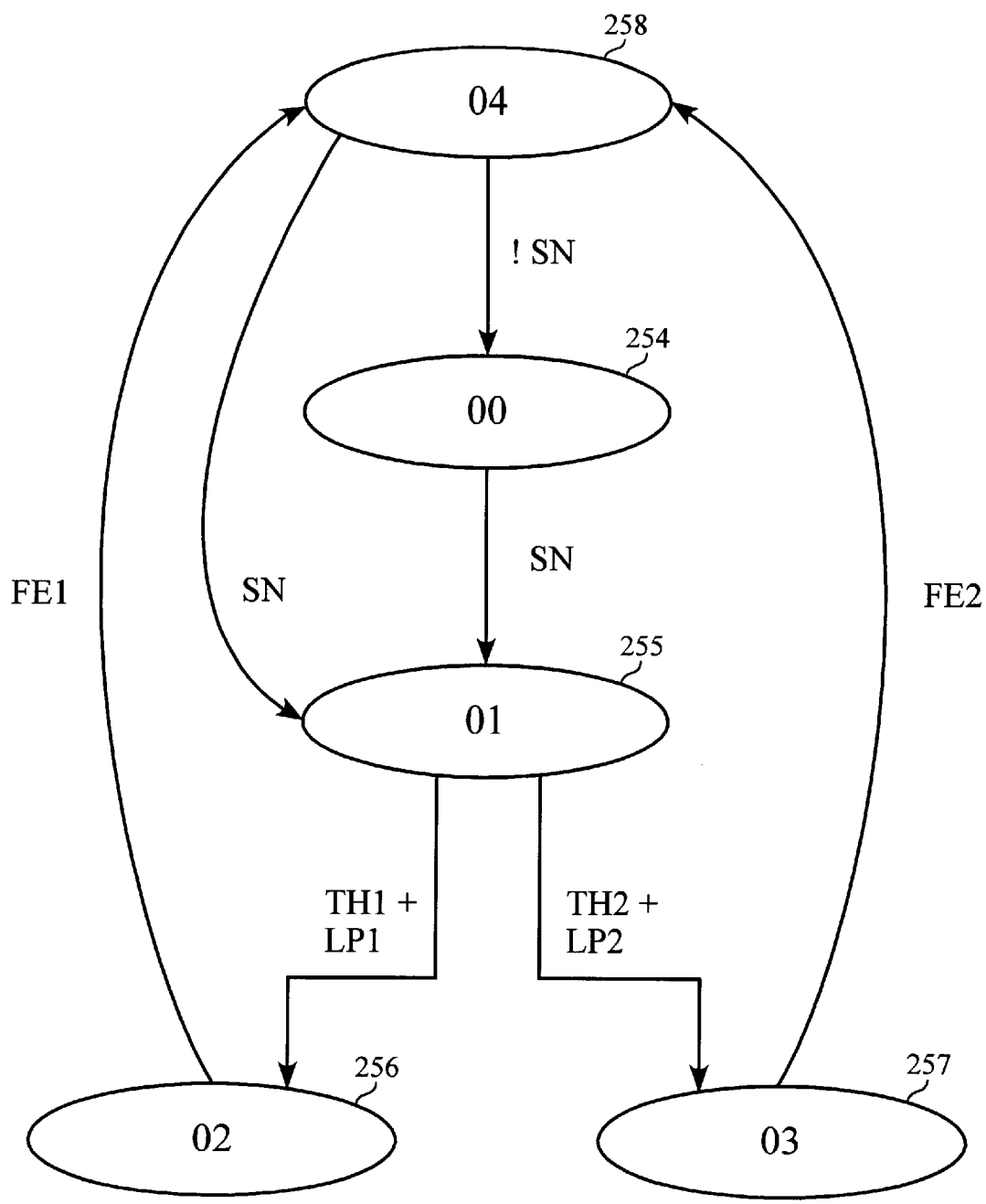
FIG. 38 is a state diagram of operation for the DMA controller of FIG. 34.

FIG. 36 shows in greater detail the construction of the FIFO Block 241 of FIG. 34. FIG. 37 gives further information on the ASB bus controller 242 of FIG. 34. FIG. 38 is a state diagram for a portion of the DMA controller sequencer 243 of FIG. 34.

Figure 39:
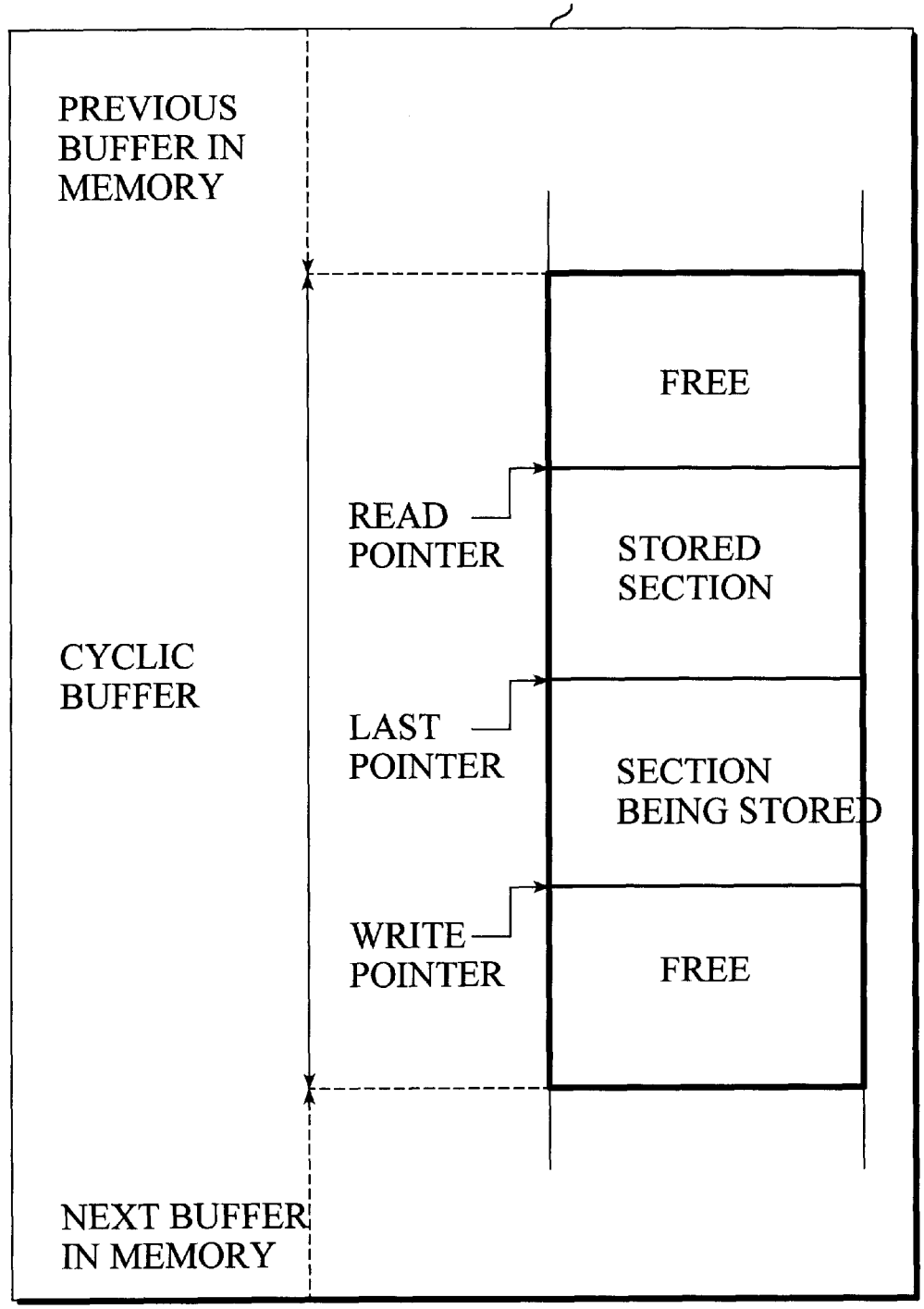
FIG. 39 is a block diagram of a cyclic buffer architecture according to one embodiment of the present invention.
Figure 40:
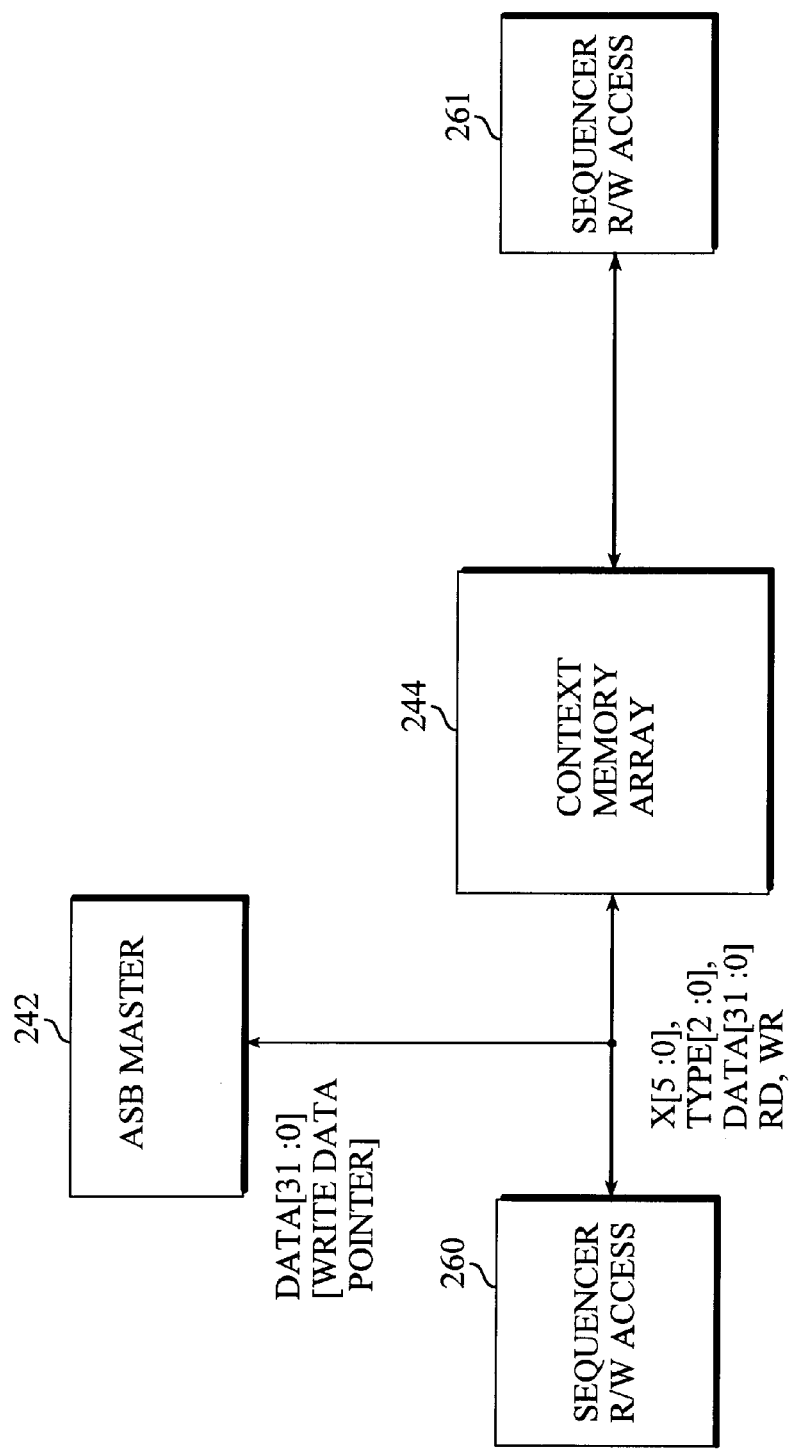
FIG. 40 is a block diagram used in explaining a context memory access mechanism according to one embodiment of the present invention.

The output signals from the DMA controller 170 are supplied by way of the ASB bus and the memory interface 61 (FIG. 5) to the memory unit 43 (FIG. 4) of the conditional access module 17. FIG. 39 shows one of the multiple cyclic buffers set up in the memory unit 43 for receiving and storing the data bytes output by the ASB bus controller 242. Context memory 244 of FIG. 34 contains the pointers that describe or define the various cyclic buffers set up in the memory unit 43. A different cyclic buffer is set up for each of the different applications, application programs or end uses to be accommodated by the system. FIG. 40 describes the access mechanism used for the context memory 244 of FIG. 34. A pair of read-write sequencers 260 and 261 are used for accessing the context memory 244.

Figure 41:
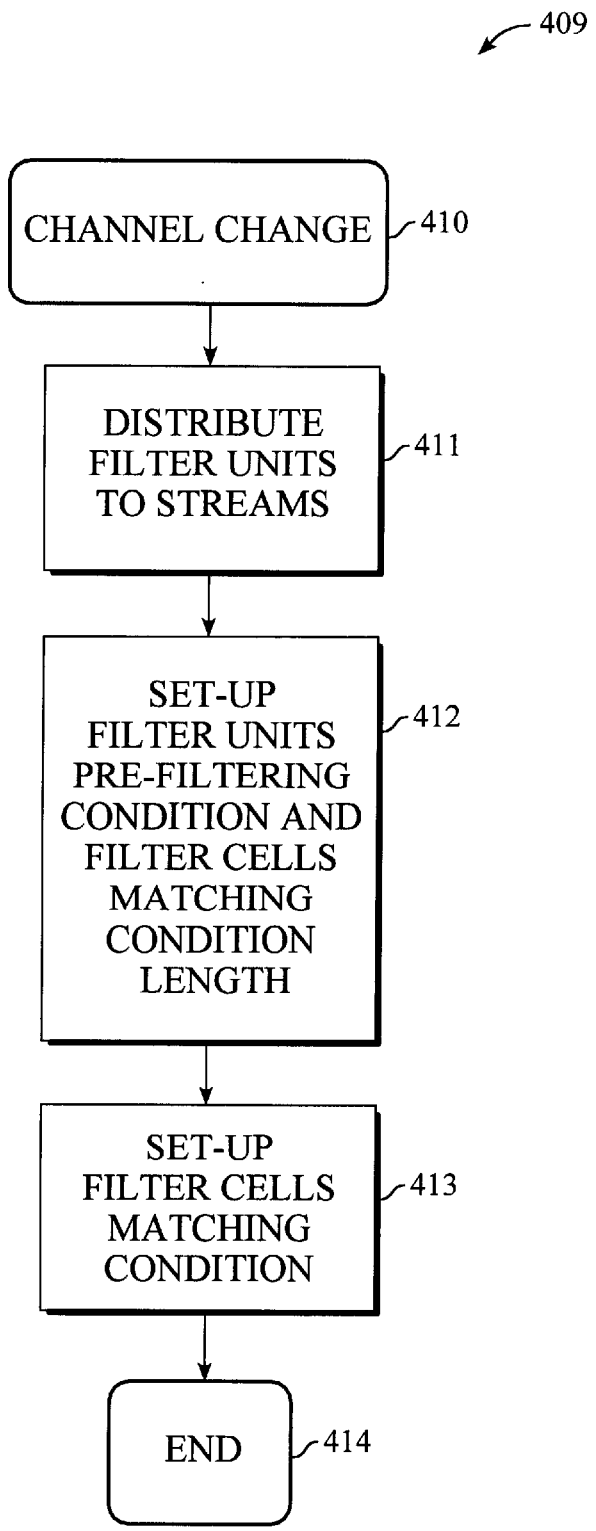
FIG. 41 is a flowchart used in explaining the initial set-up operations for the FIG. 24 filter bank each time the primary received signal channel is changed.

Referring now to FIG. 41, there is shown a flowchart used in explaining the initial set up operations for the filter bank 56a of FIG. 24 each time the receiving system is turned on or each time the primary received signal channel is changed.

As indicated by Block 410, the set up operation is triggered by a channel change (or the receiver system being switched on). The first step of the set up is to distribute or allocate the different filter units 90–93 (FIG. 24) to the different incoming data streams (FLTin1 and FLTin2 in FIG. 24). For example, filter units 90 and 91 may be allocated to process the signals received by the in-band receiver 30 (FIG. 4), while filter units 92 and 93 are allocated to process the signals received by way of the out-of-band receiver 31 (FIG. 4). Depending on the application requirements, each of filter units 90–93 is independently linked to a particular incoming data stream. More than one of filter units 90–93 can be connected to one of the incoming data streams, but only one data stream is handled by each filter unit.

The next step in the initial set up is indicated by Block 412 in FIG. 41. This set up step includes the set up of the pre-filtering condition in type filter 96 (FIG. 27) and the set up of the filter cell matching length condition in the data counter 202 (FIG. 30) in each of the filter cells 97a–97h. The final step in the initial set up as indicated by Block 413 of FIG. 41 is to load the matching digital data signal patterns into the pattern memory 98 in each of the filter units 90–93. This completes the initial set up procedure as indicated by Block 414 in FIG. 41.

Figure 42:
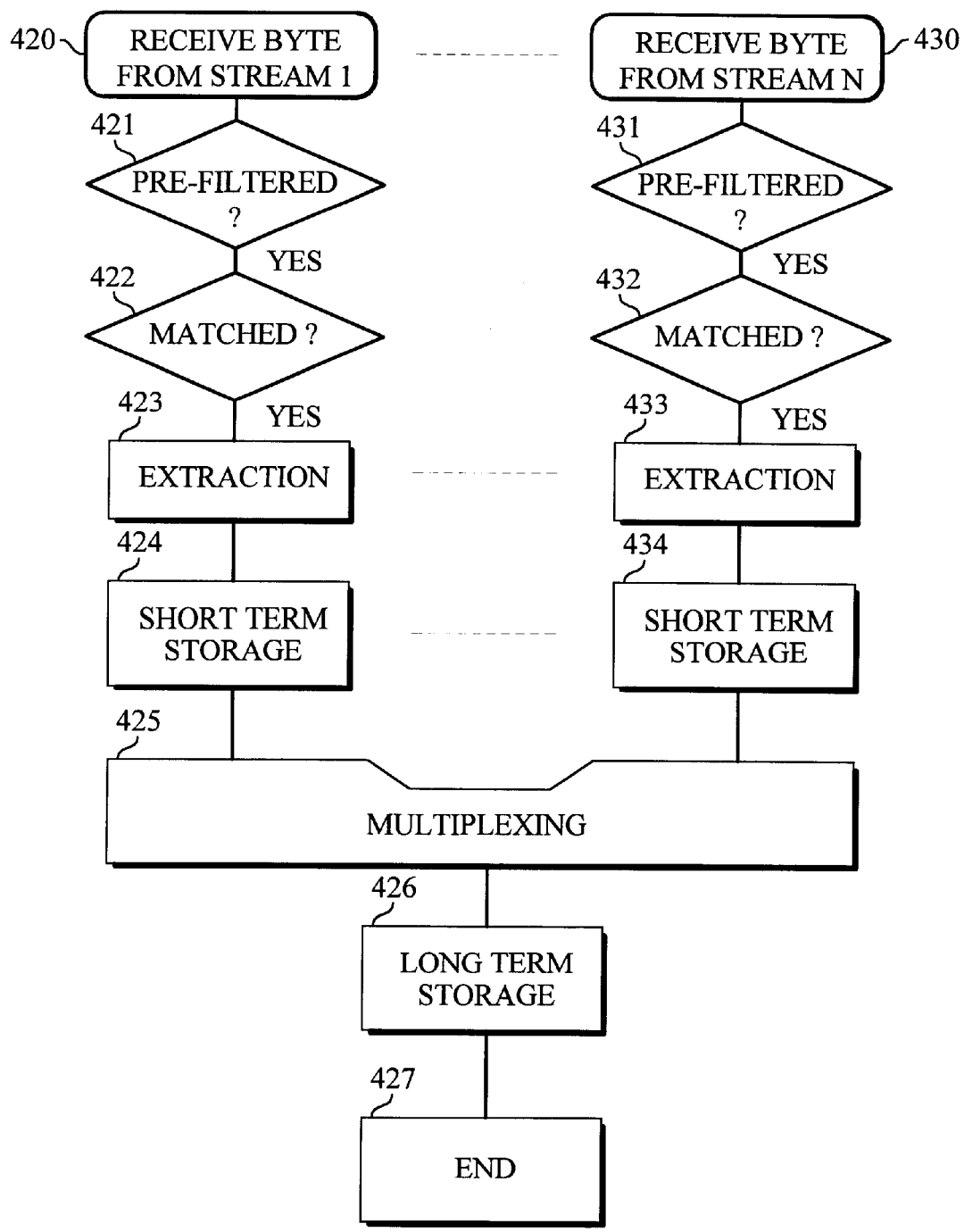
FIG. 42 is a flowchart used in explaining the filtering operations performed by the filter bank of FIG. 24.

Referring now to FIG. 42 of the drawings, there is shown a flowchart used in explaining the filtering operations performed by the filter bank 56a of FIG. 24. As indicated by Blocks 420 and 430, the filter bank 56a receives a plurality of different digital data transport streams, one of which is received by input bus FTLin1 and another of which is received by way of input bus FLTin2. The receipt of a data byte on one of these buses starts the processing mechanism depicted in FIG. 42. The received data byte is first tested to see if it has passed the pre-filtering test performed by the type filter 96 in one of the filter units 90–93. This is indicated at Blocks 421 and 431 in FIG. 42. The received byte is then tested to see if it has matched the digital signal pattern provided to one of the filter cells 97a–97h by the pattern memory 98. This testing is indicated by Blocks 422 and 432 for the two data streams. The tested data byte is thereafter extracted if it has past both the pre-filtering test of Block 421 and the pattern matching test of Block 422. In other words, if the received data byte matches the digital signal pattern supplied to one of the filter cells 97a–97h, then a match indication signal is produced by the filter cell and supplied to the shift register 99 to commence a read out of the data byte.

The extracted data byte is supplied to the DMA controller 170 and is temporarily stored in one of the FIFO units 245 and 246. The use of two FIFO units avoids a conflict when data bytes are extracted from two different data streams at about the same time. This storage in one of the FIFO units 245 and 246 is represented by the short term storage Blocks 424 and 434 in FIG. 42. The extracted data bytes coming from all active data transport streams are multiplexed by the ASB bus controller 242 and are written into the system memory unit 43 into the cyclic buffer assigned to the particular end use for which the data byte is intended. This multiplexing is indicated by Block 425 and the writing into memory 43 is represented by Block 426. When all the data bytes for an object have been stored into the system memory 43, the system application is interrupted. The data stored in the cyclic buffer is then used by its particular application program or intended end use. In this manner the signal segments intended for different end uses are separated out from their incoming transport signal stream and are made available for their intended end use.

Figure 43:
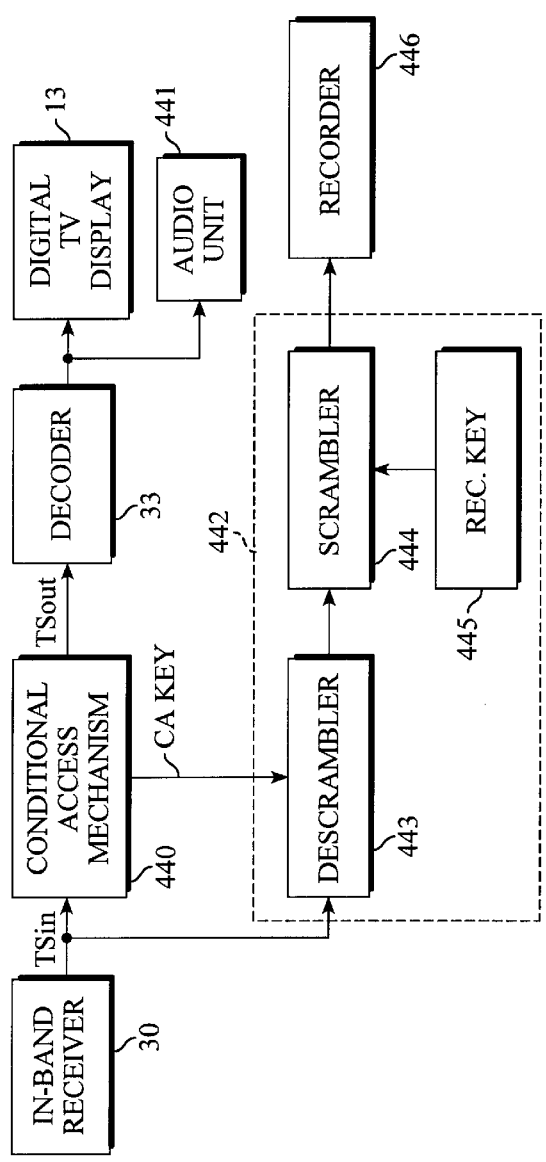
FIG. 43 shows representative a form of construction for a recording portion of a private secure recording system feature of the present invention.
Figure 44:
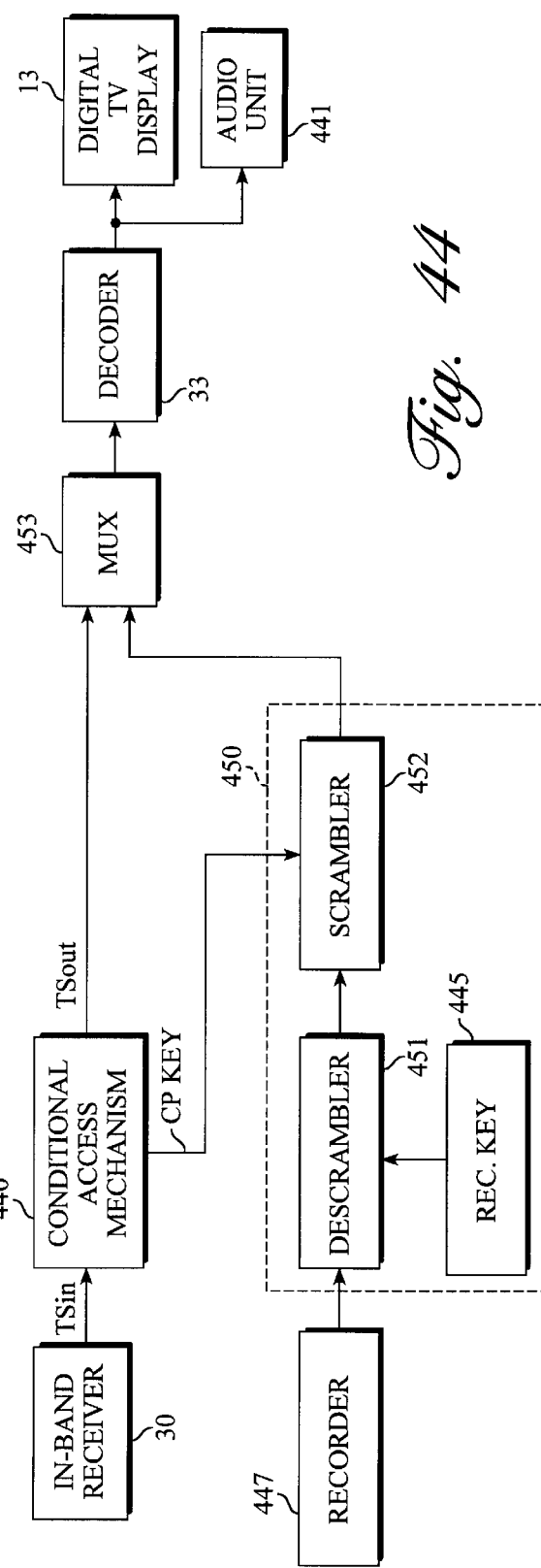
FIG. 44 shows a representative form of construction for a playback portion of a private secure recording system feature of the present invention.

FIGS. 43 and 44 show representative forms of construction for a recording portion and a playback portion, respectively, of a private secured recording system feature of the present invention. For sake of example, they are shown as subsystems of a conditional access system of the type herein described for receiving scrambled digital signals and supplying copy protected versions thereof to an appropriate end-user system. The conditional access system includes the in-band receiver 30, a conditional access mechanism 440 and the decoder 33. The end-user system in this example is represented by a digital TV display 13 and an audio unit 441. For sake of example, the conditional access mechanism 440 is assumed to be of the same construction of the conditional access module 17 described in connection with FIGS. 4 and 5. As such, the conditional access mechanism 440 receives a scrambled digital signal stream (for example, a digital television stream) from the in-band receiver 30, processes same and supplies a copy protected version thereof to the decoder 33 which is part of the end-user system.

With reference to FIG. 43, there is shown a private recording subsystem 442, which is responsive to the received scrambled signals TSin appearing at the output of the in-band receiver 30 for making a private copy of such signals. The private recording subsystem 442 includes a descrambler mechanism 443 which is responsive to the received scrambled signals for descrambling the same to produce at the output of descrambler 443, a clear copy version of the received signals. These signals are descrambled in accordance with the same conditional access (CA) cipher key used by the conditional access mechanism 440. This conditional access cipher key is transmitted by the central broadcasting station as a subchannel, that is by way of a subchannel which accompanies the primary broadcast channel. The clear copy signals appearing at the output of descrambler 443 are supplied to a scrambler 444 which operates to scramble such signals in accordance with a private cipher key supplied by unit 445. This produces at the output of the descrambler mechanism 444 security protected privately scrambled signals which are supplied to a signal storage medium in a recorder 46 for producing on such signal storage medium a private recorded copy of the received signals.

The cipher key, that is the private cipher key, is identified in the present embodiment as a recording (rec) key. Unit 445 may be, for example, a multibyte register which is loaded with a private cipher key obtained from the microprocessor unit 42. This private cipher key is a locally generated cipher key as opposed to being transmitted from the remote central broadcasting station.

The signal storage medium on which the private copy is made may take various forms. It may take form of, for example, a removable memory device, a computer storage medium, a magnetic storage medium, an optical storage medium or an integrated circuit memory device. The recorder 446 takes the form of an appropriate recorder for the particular signal storage medium as being used.

Referring to FIG. 44, there is shown a private playback subsystem 450 for use with the conditional access system for playing back privately recorded copies of received signals. In this embodiment, there is provided a playback mechanism 447 for playing back the privately scrambled signals recorded on the signal storage medium. The playback mechanism for 447 may be part of the recorder mechanism 446, that is the recording and playback functions may be provided by different portions of the same unit.

The played back privately scrambled signals appearing at the output of the playback mechanism 447, are supplied to a descrambler mechanism 451 in the playback subsystem 450. Descrambler mechanism 451 descrambles the playback signals in accordance with the same private cipher key used in the recording process to produce at the output of descrambler 451, a clear copy version of the recorded signals. The private cipher key (rec. key) is obtained from the same cipher key source 445 as used in the FIG. 3 recording subsystem for recording the signals. In order to maintain compatibility with the conditional access system, the clear copy signals appearing at the output of descrambler 451 are supplied to a scrambler mechanism 452 which it scrambles such signals in accordance with the copy protection cipher key (CPkey) used by the conditional access system. The copy protection scrambled signals at the output of scrambler 452 are supplied to the desired end-user system by way of a multiplexer 453 which switches between the playback recorded signal and a live incoming signal from the in-band receiver 30 in an appropriate manner as shown by the end-user.

The key feature of the private recording system described in FIGS. 43 and 44 is to scramble the signals in accordance with a private cipher key before they are recorded and then to descramble the recorded signals in accordance with the same private cipher key when they are played back. This means that the recording on the signal storage medium, that is the resulting recording on the signal storage medium is only usable by a person or machine having knowledge of the private cipher key. These functions are provided by the scrambler mechanism 444 of FIG. 43 and the descrambler mechanism 451 of FIG. 44. By way of contrast, the conditional access descrambling provided by the descrambler 443 of FIG. 43 and the copy protection scrambling provided by scrambler 452 of FIG. 44 are for purposes of making the recording an playback operations compatible with the overall operation of the conditional access system. The conditional access descrambler 443 is needed because the incoming signals from the in-band receiver 30 are scrambled signals. The recording subsystem 442 in effect functions as a scrambling format converter for converting from one scrambling format to a different scrambling format. This is done by descrambling the first signal to produce a clear copy version thereof and then scrambling the clear copy signal in accordance with the second scrambling format. This is necessary to provide the private scrambling format for the recorded signals.

With respect to the playback system of FIG. 44, the copy protection scrambler 452 is needed because the decoder 33 in the end-user that is associated with the end-user equipment is designed to handle copy protected, that is signals with copy protection scrambling.

If the private recording system of FIGS. 43 and 44 is used in a separate stand-alone manner and not as part of a conditional access system, or some other form of scrambled signal system, then the conditional access descrambler 443 and the copy protection scrambler 452 may be omitted.

While there have been described what are at present considered to be preferred embodiments of this invention, it will be obvious to those skilled in the art that various changes and modifications may be made therein without departing from the invention and it is, therefore, intended to cover all such changes and modifications coming within the true spirit and scope of the invention.

What is claimed is:

1. A digital signal filtering mechanism for separating signal segments intended for different end uses, such mechanism comprising:

input circuitry for receiving multiple transport streams of packets or cells;

a pattern pre-filtering mechanism for identifying data bytes of a received packet or cell according to the data byte position within the packet or cell;

a section filtering mechanism for identifying data bytes according to their value within the packet or cell, for producing a match indication signal when a match is detected and for changing or reassigning a section length of at least one active filter cell;

and a data extraction mechanism responsive to the match indication signal for transferring a corresponding group of received data bytes to an end use location assigned to the end use identified by the digital signal pattern which produced the match.

2. A digital signal filtering mechanism in accordance with claim 1 wherein the section filtering mechanism includes a unique pattern memory unit for storing a plurality of specific sections individually identifying different user application program.

3. A digital signal filtering mechanism in accordance with claim 1 wherein the section filtering mechanism includes a plurality of filtering cells units for going after multiple section in parallel.

4. A digital signal filtering mechanism in accordance with claim 1 wherein the data extraction mechanism includes a shift register for extracting at least one data byte that matches a specified section prior to a relevant payload of a packet or cell processed by said digital signal filtering mechanism.

5. A digital signal filtering mechanism in accordance with claim 1, wherein:

said pattern pre-filtering mechanism detects different predefined digital patterns within received digital signals;

said mechanism further comprises circuitry for transferring data bytes associated with each of the different predefined digital patterns to different end use locations.

6. A digital signal filtering system in accordance with claim 5 wherein said end use locations are different application programs.

7. A digital signal filtering mechanism in accordance with claim 1, further comprising:

a plurality of filter units for receiving a plurality of digital data transport streams and for separating transport stream segments intended for different end uses;

a plurality of short term storage units for receiving the separated segments;

a long term storage unit;

and a multiplexer mechanism for coupling the short term storage units to the long term storage unit in a time shared manner.

8. A digital signal filtering mechanism in accordance with claim 1, further comprising a descrambler mechanism for receiving and producing a descrambled version of a scrambled version of said received packet or cell; and a recording/playback system, wherein said received packets or cells are digital television signals and the playback system is a television display system.

9. A digital signal filtering mechanism in accordance with claim 1, further comprising a recording/playback system, wherein said received packets or cells are digital video signals and the playback system is a video monitor system.

10. A digital signal filtering mechanism in accordance with claim 1, further comprising a recording/playback system, wherein said received packets or cells are digital audio signals and the playback system is an audio sound system.

11. A digital signal filtering mechanism in accordance with claim 1, further comprising a recording/playback system and a removable memory storage device for said received packets or cells.

12. A digital signal filtering mechanism in accordance with claim 1, further comprising a recording/playback system and a computer storage medium for said received packets or cells.

13. A digital signal filtering mechanism in accordance with claim 1, further comprising a recording/playback system and a magnetic storage medium for said received packets or cells.

14. A digital signal filtering mechanism in accordance with claim 1, further comprising a recording/playback system and an optical storage medium for said received packets or cells.

15. A digital signal filtering mechanism in accordance with claim 1, further comprising a recording/playback system and an integrated circuit memory device for said received packets or cells.

16. A digital signal filtering mechanism in accordance with claim 1, further comprising a recording system for recording signals in a copy protected manner, the recording system comprising:

a scrambler mechanism responsive to a signal to be recorded for producing a scrambled version thereof which is scrambled in accordance with a predetermined cipher key; and a recording mechanism for recording the scrambled signal on a signal storage medium to produce a security protected copy thereof.

17. A digital signal filtering mechanism in accordance with claim 1, further comprising playback system for reproducing signals recorded on a signal storage medium in a scrambled format using a predetermined cipher key, the playback system comprising:

a playback mechanism for playing back scrambled signals recorded on a signal storage medium;

a descrambler mechanism responsive to the played back signals for descrambling such signals in accordance with the predetermined cipher key; and circuitry for supplying the descrambled signals to an end-user system.

18. A digital signal filtering mechanism in accordance with claim 1, further comprising a conditional access subsystem for receiving scrambled digital signals and supplying a copy-protected version thereof to an end-user system and a private recording subsystem for making a private copy of the received signals, the recording subsystem comprising:

a descrambler mechanism responsive to the received scrambled signals for descrambling the received scrambled signal to produce a clear copy version thereof;

a scrambler mechanism responsive to receipt of the clear copy version, for scrambling the clear copy version in accordance with a private cipher key; and circuitry for supplying the privately-scrambled signal to a signal storage medium for producing a private recorded copy thereof.

19. A private recording subsystem in accordance with claim 18, wherein said descrambler mechanism descrambles said received signals in accordance with a transmitted cipher key.

20. A private recording subsystem in accordance with claim 19, further comprising a conditional access system that requires presentation of a selected conditional access key in order to provide access to said private recording subsystem, wherein said transmitted cipher key coincides with the conditional access cipher key.

21. A digital signal filtering mechanism in accordance with claim 1, further comprising a conditional access system for receiving scrambled digital signals and supplying a copy-protected version thereof to an end-user system, a private playback subsystem for playing back a private recorded copy of received signals, the playback subsystem comprising:

a playback mechanism for playing back privately scrambled signals recorded on a signal storage medium, where the privately scrambled signals have been scrambled in accordance with a private cipher key;

a descrambler mechanism that receives and descrambles the privately scrambled signals in accordance with the private cipher key to produce a clear copy version thereof; and a scrambler mechanism responsive to the clear copy signals for scrambling the clear copy signals in accordance with the copy protection cipher key used by the conditional access system; and circuitry for supplying the copy protection scrambled signals to an end-user system.

22. A digital signal filtering mechanism in accordance with claim 1, further comprising:

a scrambler mechanism that receives at least one of said packets or cells and produces a version of said received packet or cell that is scrambled according to a selected cipher key;

a recording mechanism for recording the scrambled version of said received packet or cell on a signal storage medium;

a descrambler mechanism for receiving and producing a descrambled version of the scrambled version of said received packet or cell; and a playback mechanism for playing back the descrambled version of said received packet or cell.

23. A digital signal filtering mechanism in accordance with claim 22, wherein said selected cipher key is a locally-generated cipher key.

* * * * *